United States Patent [19]
Heard et al.

[11] Patent Number: 5,747,796
[45] Date of Patent: May 5, 1998

[54] WAVEGUIDE TYPE COMPACT OPTICAL SCANNER AND MANUFACTURING METHOD THEREOF

[75] Inventors: David Heard, Kashiwa; Noboru Ohtani, Tokyo; Yutaka Unuma, Matsudo; Manabu Fujimoto, Kashiwa, all of Japan

[73] Assignee: Sharp Kabushiki Kaisha, Osaka, Japan

[21] Appl. No.: 677,141

[22] Filed: Jul. 9, 1996

[30] Foreign Application Priority Data

| Jul. 13, 1995 | [JP] | Japan | 7-177732 |
| Jul. 13, 1995 | [JP] | Japan | 7-177733 |
| Jul. 13, 1995 | [JP] | Japan | 7-177734 |
| Jul. 14, 1995 | [JP] | Japan | 7-178825 |

[51] Int. Cl.$^6$ ............................................. H01J 5/16
[52] U.S. Cl. ........................... 250/227.26; 250/227.2; 250/235; 385/32
[58] Field of Search .................. 250/234, 235, 250/208.1, 227.11, 227.26, 227.28, 227.29, 227.2, 216; 385/8, 32; 358/482, 483

[56] References Cited

U.S. PATENT DOCUMENTS 5,093,874  3/1992  Hawkins et al. ..................... 385/8

FOREIGN PATENT DOCUMENTS

| 730716 | 1/1995 | Japan . |
| 7301730 | 11/1995 | Japan . |
| 8160239 | 6/1996 | Japan . |

OTHER PUBLICATIONS

J. Yamauchi et al., "Beam–Propagation Analysis of Bent Step–Index Slab Waveguides", Electronics Letters, vol. 26, No. 12, pp. 822–824, published on Jun. 7, 1990.

*Primary Examiner*—Que Le

[57] ABSTRACT

A waveguide type reduction type image sensor has a waveguide type light source having a light emitting element and a substrate including optical waveguides having a planar waveguide and a tapered waveguide. The waveguide type reduction type image sensor also has a light detecting section having a microlens array, an optical waveguide substrate and a CCD array. The microlens array converges reflected light from an original onto the incident face of the optical waveguide substrate. The optical waveguide substrate has L-shaped optical waveguides for guiding the converged light to the CCD array located on a substrate face perpendicular to the incident face. The CCD array converts the guided light to an electric signal and outputs this electric signal. A manufacturing method of this waveguide type reduction type image sensor is also shown.

4 Claims, 25 Drawing Sheets

WAVEGUIDE TYPE COMPACT OPTICAL SCANNER AND MANUFACTURING METHOD THEREOF

BACKGROUND OF THE INVENTION

1. Field of the Invention

The present invention relates to an image sensor used in an optical unit for one-dimensionally reading an image. More particularly, the present invention relates to a reduction type image sensor fabricated using optical waveguides.

The present invention also relates to the design of an optical image sensor usable in a device such as a facsimile machine, a bar code reader and a computer image input device. More particularly, the present invention relates to the optical design of an image scanner fabricated by using an array of optical waveguides. The present invention discloses a new designing method in which the image sensor can be easily fabricated and stability and performance of the image sensor in use are improved by integrating an LED array with a waveguide substrate so as to direct light from an LED (light emitting diode) light source onto an object.

The present invention also relates to an optical scanner for converting an image to electronic data and is able to be utilized in a facsimile machine, a scanner used to input compositions and figures to a computer, an optical bar code reader, etc.

The present invention further relates to an image sensor used in a one-dimensional reading optical system of a hard copy, etc. More particularly, the present invention relates to a reduction type image sensor using optical waveguides and a manufacturing method of this reduction type image sensor.

2. Description of the Related Art

Recently, high performance and compactness of a one-dimensional image sensor for converting image information to an electric signal are required as the demand for an image reader used in a facsimile machine, an image scanner, a digital copying machine, etc. has increased. A general one-dimensional image sensor of a facsimile machine, etc. can be divided into two kinds of structures composed of a reduction type structure and a contact type structure (also called an equal magnification type structure). In the reduction type structure, a one-dimensional image is reduced in size and is projected onto a charge coupled device (CCD) face by a lens. In the contact type structure, a lens projects the image, with unify magnification, onto an optoelectronic detector which corresponds one-to-one with the image. A waveguide type reduction type image sensor utilizing an optical waveguide array instead of a lens is described in this patent.

An LED array having LEDs arranged in a linear shape and a linear light source of a fluorescent lamp, etc. are widely used as a light source of the image sensor.

FIG. 1 is a view for explaining the operation of a reduction type image sensor. An original 1 is illuminated by a light emitting diode array linearly arranged or a linear light source 7 such as a fluorescent lamp, etc. The light emitting diode is called an LED in the following description. Reflected light from the original 1 is focused and formed as a reduced image on a photoelectric converting element array 30 such as a CCD, etc. by a lens 40. The photoelectric converting element array 30 converts the image information of the original formed as the reduced image to an electric signal of time series and outputs this converted electric signal.

FIG. 2 shows a contact type image sensor. This contact type image sensor is arranged such that the detector of a photoelectric converting element array 31 covers the entire reading width. Reflected light from an original 1 irradiated by a light source 7 is incident on the photoelectric converting element array 31 directly or through a lens array 41 so that image information is converted to an electric signal.

Japanese Patent Application Laying Open (KOKAI) No. 7-301730 shows a waveguide type reduction type image sensor to solve problems of the above reduction type image sensor and the above contact type image sensor. FIG. 3 is a view schematically showing the waveguide type reduction type image sensor. FIG. 4 is a plan view of the waveguide type reduction type image sensor. The waveguide type reduction type image sensor has a microlens array 4 formed along the width of the front face, an optical waveguide substrate 2 and a photoelectric converting element array 3. Plural three-dimensional waveguides for guiding light from an input image to the photoelectric converting element array are formed in the optical waveguide substrate 2. In the following description, each of the three-dimensional waveguides is simply called a waveguide. The waveguide type reduction type image sensor obtains a reduced image by setting the waveguide pitch at the emitting end of the waveguide to be narrower than the waveguide pitch at the incident end of the waveguide. In the waveguide type image sensor, a coupling optical system, the optical waveguide substrate and the photoelectric converting element array are integrated with each other so that subsequent alignment or adjustment is not necessary. Further, this integrated waveguide type reduction type image sensor has excellent shock resistance and cost thereof can be reduced.

Resolution of the reduction type image sensor shown in FIG. 1 is determined by lens performance and the pixel pitch of the photoelectric converting element array 30. In the case of a reading resolution of 200 dpi (200 dots per one inch) and a reading width of 256 mm, the distance (optical path length) d between the original 1 and the photoelectric converting element array 30 is about 330 mm. Cost of the reduction type image sensor is low and a reading operation of this reduction type image sensor can be performed at a high speed. However, element sizes in the reduction type image sensor are large since light is converged by the lens 40. Therefore, no reduction type image sensor can be made compact. Further, it is complicated to adjust the optical system of the reduction type image sensor.

In contrast to this, in the contact type image sensor, the distance (optical path length) d from the original 1 to the photoelectric converting element array 31 is short. The photoelectric converting element array has a large size and is thus expensive, and it is necessary to arrange a complicated electronic circuit for operating the photoelectric converting element array. Therefore, it is difficult to reduce cost of the contact type image sensor.

In the construction of the waveguide type image sensor shown in FIG. 4, the noise level is increased and the S/N ratio (a signal/noise ratio) is reduced when stray light caused by light scattering from irregularities of the light coupling portion (the waveguide incident end face) to the waveguide and the waveguide side is incident on the photoelectric converting element array 3.

The light source is constructed by using the LED array in which, for example, 27 LEDs are arranged linearly along the original face width. As shown in FIG. 3, the light source is arranged in a position in which generated light is incident on the original at 45 degrees. The LED array has a structure in which the original is directly irradiated from a point light source. Accordingly, it is difficult to make the LED array compact. Further, there are problems of non-uniform irradiation, large energy loss caused by spreading of the irradiated light, etc. and further, it is difficult to operate the LED array with low voltage and reduce power consumption of the LED array.

A waveguide type image sensor is fabricated by utilizing an optical waveguide array formed on a plastic or glass substrate. Light scattered from an image is first coupled into the waveguide array by using an array of microlenses. Then, this light is transmitted to a CCD (charge coupled device) type detector through a waveguide. A light source of this type of device is constructed by an array of LED light emitting devices.

In this type of device, an array of optical waveguides is fabricated on a glass or plastic substrate. Light spread from an image is first coupled into the array of optical waveguides. Thereafter, this light is transmitted to an optical detector of a CCD type through these waveguides.

An LED array emitting 570 nm light is used as the light source. In a typical case, the LED array is fixed at an oblique angle (about 45 degrees) to an object plane at a distance typically from 5 mm to 10 mm depending on the design of the scanner. The LED light emitting device is characterized in that light is not unidirectional, but spreads out over a wide region. A typical diode has peak emission at 30 degrees to its normal and its intensity does not drop to 50% of the peak until 85 degrees from the normal.

Further, in the general system, all optical systems of the LED array and the detector are separately arranged so that there is a danger of miss alignment of these optical systems.

At present, the optical scanner has two kinds of general constructions as shown in FIGS. 5 and 6. A light source is constructed by an array of light emitting diodes (LEDs) or a light emitting tube of a fluorescent type and irradiates an object portion 71 on a page or line to be scanned. For example, in a first general example shown in FIG. 5, light reflected from the object 71 is normally converged onto a single photodetector 73 such as a charge coupled device (CCD) by a lens or a lens system 72. Resolution of this system is determined by the spacing of pixels on the CCD and performance of the lens. In the case of a scanner in a facsimile machine, a resolution of 200 dots per inch is used. In this construction, the distance d between the object and the detector is relatively large. For example, this distance d is set to about 330 mm with respect to a scan width of 256 mm. As shown in FIG. 6, a device utilizing three mirrors for reflecting light reflected from the object is used to shorten the length of the optical system. Light paths efficiently overlap each other by these mirrors so that the distance between an image and the detector can be reduced. Therefore, an actually used minimum distance between the object and the detector is 83 mm so that the scanner is made considerably compact in comparison with the scanner shown in FIG. 5.

Japanese Patent Application Laying Open (KOKAI) No. 7-30716 shows an original reader in which image information of an original is reduced by an optical waveguide arranged in a sector shape by reducing the waveguide pitch on the emitting side of the device with respect to the pitch on the incident side of the device. This original reader is compact and it is not necessary to adjust the optical axis in comparison with a device for reducing an image by using the above lens and mirrors.

In the original reader shown in Japanese Patent Application Laying Open (KOKAI) No. 7-30716, the optical waveguides are arranged in a sector shape. Accordingly, when the angle between the waveguide and the front face of the waveguide substrate is small, reflected light from the object is not efficiently coupled into the waveguide and output light from the waveguide is not efficiently coupled out of the waveguide. In order to maintain reasonable coupling efficiencies the angle between the waveguide and the front face of the waveguide substrate must be kept large. Consequently, it is not possible to have a high image reduction rate while maintaining compact size.

A reduction type image sensor using plural optical waveguides has been recently proposed. For example, Japanese Patent Application Laying Open (KOKAI) No. 7-301730 shows a waveguide type reduction type image sensor having a lens, an optical waveguide substrate and a photoelectric converting element array. The lens is formed along the width of the front face. The optical waveguide substrate has plural waveguides formed such that these waveguides guide light converged by this lens. Light guided by these plural waveguides is incident on the photoelectric converting element array. Cost of this image sensor is low and elements of this image sensor can be made compact. Further, it is not necessary to adjust the optical system of this image sensor.

Several methods for manufacturing a polymeric optical waveguide using a polymeric material as a core which can be used in such a reduction type image sensor are proposed.

In a first manufacturing method, a patterned substrate composed of a polymeric material such as PMMA, etc. and having the pattern of a groove constituting a capillary is manufactured by using a normal injection moulding machine. Next, the grooved portion of the manufactured patterned substrate is filled with a polymeric precursor material as a polymeric raw material for the core of the waveguide. A plane substrate constructed by a polymer such as PMMA, etc. then comes in close contact with the grooved portion of the patterned substrate. Thereafter, the grooved portion is polymerized 1 by irradiation of an ultraviolet ray, etc. so that the core of the optical waveguide constructed by the polymeric material is formed.

Japanese Patent Application Laying Open (KOKAI) No. 8-160239 shows another manufacturing method of the polymeric optical waveguide. In this manufacturing method, the patterned face of the patterned substrate having the pattern of a groove constituting a capillary comes in close contact with the plane substrate so that the capillary is formed by this groove. Thereafter, this capillary is filled with a monomer solution as the raw material of the core of the optical waveguide by a capillary phenomenon. Then, this monomer solution is polymerized. In this manufacturing method, no gap is formed on the boundary between the patterned substrate and the plane substrate. Accordingly, there is no crosstalk caused by leaked light between cores so that a polymeric optical waveguide having excellent optical waveguide characteristics can be realized.

The general reduction type image sensor using a lens system requires a long optical path length between an original face and a solid-state image sensor. Therefore, it is difficult to make the reduction type image sensor compact. Further, when the image sensor is fabricated, it is necessary to adjust the optical system every image sensor. Furthermore, the reduction type image sensor is weak in vibration.

In the general contact type image sensor, the photoelectric converting array has the same size as the original width. Accordingly, the S/N ratio of the photoelectric converting signal is reduced and it is difficult to operate the contact type image sensor at a high speed because of a parasitic capacitance between wirings in a certain case.

In the reduction type image sensor using optical waveguides, elements can be made compact and no adjustment of the optical system is required in comparison with the above two image sensors. Further, cost of the reduction type image sensor is very low and the reduction type image sensor has high performance and can be made compact. However, there is some loss of the optical signal in the bent portion of each of the waveguides indispensable to a reduction in the size of an original image.

A manufacturing method of the optical waveguide has the following problems.

The optical waveguide manufactured by the first manufacturing method described in the prior art is formed by filling the patterned substrate with a core material and sticking the patterned substrate and the plane substrate together. Therefore, a polymeric material for the core is polymerized in a projecting state between the plane substrate and the patterned substrate so that a thick layer approximately ranging from 1 to 10 μm is formed. Accordingly, when light is incident on the optical waveguide, this light is leaked to the layer and is diffused to the entire device. In contrast to this, if the optical waveguide is manufactured by using the second manufacturing method described in the prior art, the core material is drawn up after the patterned substrate and the plane substrate are stuck together. Therefore, there is no layer between the patterned substrate and the plane substrate so that no light is leaked between cores.

Loss of the optical signal in the bent portion of the optical waveguide can be reduced by forming a groove filled with a substance having a refractive index lower than that of a peripheral substrate outside this bent portion. These results are confirmed by simulation and are described in "J. Yamauchi et al: 'Beam-Propagation Analysis of Bent Step-Index Slab Waveguides', ELECTRONICS LETTERS, 1990, Vol. 26, No. 12, p 822–p 824".

SUMMARY OF THE INVENTION

It is therefore a first object of the present invention to provide a waveguide type photodetecting means for preventing a reduction in S/N ratio of a photoelectric converting signal obtained by waveguide uncoupled light and scattered light, and provide a linear light source of a waveguide type for obtaining a uniform irradiated light amount, and further provide a compact waveguide type reduction type image sensor having high performance and the waveguide type photodetecting means and the waveguide type linear light source integrated with each other.

A second object of the present invention is to provide an image sensor for solving the problems that light emitted from an LED for illuminating an object is not utilized efficiently by the image sensor and all the optical systems of an LED array and a detector are separate so that it is difficult to align these optical systems with each other.

A third object of the present invention is to provide a compact scanner for increasing the reduction rate of an image while reducing the distance between the object and the detector, and having a simple structure which can be cheaply manufactured.

A fourth object of the present invention is to provide a waveguide type reduction type image sensor capable of reducing the loss of the optical signal in the bent portion of an optical waveguide.

A fifth object of the present invention is to provide the manufacturing method of an optical waveguide having a structure for reducing the loss of the optical signal in the bent portion of an optical waveguide.

In accordance with a first construction of the present invention, the above first object can be achieved by a waveguide type reduction type image sensor comprising:

light source means for irradiating light to an original to be read; and light detecting means for detecting reflected light from the original and converting this reflected light to an electric signal;

the light detecting means having:
an array of microlenses linearly arranged on an incident face which converge the reflected light;
an array of photoelectric converting elements arranged on a face perpendicular to the incident face of the reflected light and converting light to an electric signal; and
an optical waveguide substrate having an array of L-shaped optical waveguides for guiding the light converged by the microlenses to the photoelectric converting elements.

In accordance with a second construction of the present invention, the array of photoelectric converting elements is arranged on one face of the optical waveguide substrate perpendicular to the incident face of the reflected light.

In accordance with a third construction of the present invention, the array of photoelectric converting elements is divided and arranged on two faces of the optical waveguide substrate perpendicular to the incident face of the reflected light.

In accordance with a fourth construction of the present invention, the above first object can be also achieved by a waveguide type reduction type image sensor comprising:

light source means for irradiating light to an original to be read; and light detecting means for detecting reflected light from the original and converting this reflected light to an electric signal;

the light source means having:
a light emitting element for emitting light; and
an optical waveguide substrate having plural optical waveguides for guiding light from the light emitting element such that this light is linearly irradiated to the original.

In accordance with a fifth construction of the present invention, the optical waveguide substrate includes a tapered waveguide arranged on a face of each of the waveguides on its light emitting element side and a planar type waveguide connected to a face of each of the waveguides on its irradiating side; and a cylindrical lens is arranged between the light emitting element and the optical waveguide substrate.

In accordance with a sixth construction of the present invention, the light emitting element is divided and arranged on two faces of the optical waveguide substrate perpendicular to its irradiating face.

In accordance with a seventh construction of the present invention, the above first object can be also achieved by a waveguide type reduction type image sensor comprising:

light source means for irradiating light to an original to be read; and light detecting means for detecting reflected light from the original and converting this reflected light to an electric signal;

the light source means having:

a light emitting element for emitting light; and an optical waveguide substrate having plural optical waveguides for guiding light from the light emitting element such that this light is linearly irradiated to the original;

the light detecting means having:

an array of microlenses linearly arranged on the incident face of the device and converging the reflected light;

an array of photoelectric converting elements arranged on a face perpendicular to the incident face of the device and converting light to an electric signal; and an optical waveguide substrate having an array of L-shaped optical waveguides for guiding the light converged by the microlenses to the photoelectric converting elements;

the light source means and the light detecting means being stuck to each other.

In the first construction of the waveguide type reduction type image sensor, light is irradiated onto the original to be read by the light detecting means and the reflected light is converged by the array of microlenses. The light converged by the array of optical waveguides is guided to a corresponding photoelectric element and is converted to an electric signal. The light detecting means is constructed by the array of microlenses, the array of photoelectric converting elements and the optical waveguide substrate having L-shaped optical waveguides. Accordingly, it is possible to prevent a signal from being deteriorated as the uncoupled light is not incident on the photoelectric element. Further, a bent portion of the waveguide is formed in only one place in comparison with the construction of a general waveguide type image sensor so that light loss in the waveguide bent portion can be reduced.

In the second construction of the waveguide type reduction type image sensor, light converged by the array of optical waveguides is guided to a corresponding photoelectric converting element arranged on one face of the optical waveguide substrate perpendicular to the incident light. Since the array of photoelectric converting elements is arranged on one face of the optical waveguide substrate, the construction of the light detecting means is simplified and cost of the waveguide reduction type image sensor can be reduced. In the third construction of the waveguide type reduction type image sensor, light converged by the array of optical waveguides is guided to corresponding photoelectric elements divided and arranged on two faces of the optical waveguide substrate perpendicular to the incident light. Since the array of photoelectric converting elements is divided and arranged on the two faces of the optical waveguide substrate, the optical waveguides can be divided into right-hand and left-hand sections and can be arranged on the right-hand and left-hand sides. Accordingly, the width of the optical waveguide substrate can be reduced and the propagating loss of the longest waveguide can be reduced by half.

In the fourth construction of the waveguide type reduction type image sensor, light of the light emitting element is guided by the plural optical waveguides arranged in the optical waveguide substrate such that this light is linearly irradiated onto the original. Since the light source means is constructed by the light emitting element and the optical waveguide substrate, the light source means can be made compact and/or thin.

In the fifth construction of the waveguide type reduction type image sensor, light generated from the light emitting element is converged to the tapered waveguide by the cylindrical lens. This light is then guided to each of the optical waveguides by the tapered waveguide and is irradiated onto the original by the planar type waveguide connected to an irradiating face side of each of the optical waveguides. Thus, it is possible to obtain a uniform irradiated light intensity distribution and light of the light emitting element can be efficiently used. Accordingly, the number of light emitting elements can be reduced and power consumption of the waveguide type reduction type image sensor can be reduced.

In the sixth construction of the waveguide type reduction type image sensor, the light emitting element is divided and arranged on two faces of the optical waveguide substrate perpendicular to its irradiating face. Thus, the optical waveguides can be divided into right-hand and left-hand sections and can be arranged on the right-hand and left-hand sides. Accordingly, the width of the optical waveguide substrate can be reduced and propagating loss of a longest waveguide can be reduced by half.

In the seventh construction of the waveguide type reduction type image sensor, light of the light emitting element is guided by the plural optical waveguides arranged in the optical waveguide substrate such that this light is linearly irradiated onto the original. The reflected light is converged by the array of microlenses and incident on an array of optical waveguides. The light is then guided to a corresponding photoelectric converting element and is converted to an electric signal by each of the photoelectric converting elements. The light detecting means and the light source means are stuck and integrated with each other so that the image sensor can be made compact. Further, since the coupling optical system, the optical waveguide substrate, the photoelectric converting elements and the light source are integrated with each other, it is not necessary to separately adjust the image sensor so that the manufacturing process of the image sensor can be simplified and the image sensor has excellent shock resistance.

Further, the optical waveguides arranged in the optical waveguide substrate of the light source means/the light detecting means in the present invention can be easily manufactured by an ion diffusion method, an injection moulding method, etc. such that each of the optical waveguides has an arbitrary size. Accordingly, an image sensor corresponding to an original width can be manufactured at low cost.

In accordance with an eighth construction of the present invention, the above second object can be achieved by an image sensor comprising:

a substrate which has a face opposite to an object so as to input an image of the object and has a face with aligned CCD elements for reading this image and is formed by a material having a refractive index of light greater than that of air;

an optical waveguide for transmitting the inputted image to the CCD elements and constructed such that one end of the optical waveguide is arranged on the substrate face opposite to the object and the other end of the optical waveguide is coupled into each of the CCD elements within the substrate; and a light source for illuminating the object and arranged on any one of the substrate faces;

light of the light source being transmitted to the substrate face opposite to the object while this light is reflected on an inner face of the substrate.

In accordance with a ninth construction of the present invention, the substrate constitutes a cylindrical lens having the substrate face opposite to the object as a convex face.

In accordance with a tenth construction of the present invention, the substrate face opposite to the object is opposed to the face with aligned CCD elements, and the light source is arranged on a substrate face other than these two faces.

In the eighth construction of the present invention, a large part of light emitted by an illuminating device is transmitted until a face of the substrate opposite to an object image by internal total reflection within the substrate so that the image is efficiently illuminated.

In the ninth construction of the present invention, the substrate constitutes a cylindrical lens having the substrate face opposite to the image as a convex face. Accordingly, light transmitted within the substrate is converged to the image so that the image is further efficiently illuminated.

In the tenth construction of the present invention, the illuminating device is arranged on a substrate face separated from the face with aligned CCD elements so that the substrate can be made thin.

In accordance with an eleventh construction of the present invention, the above third object can be achieved by a compact optical scanner for scanning the image of an object while this object image is inputted and read;

the compact optical scanner comprising:
    a substrate having a face opposite to the object to input the object image and a face with aligned CCD elements for reading the object image; and
    plural optical waveguides for transmitting the inputted image to the CCD elements and arranged within a substrate such that one end of each of the optical waveguides is arranged on the substrate face opposite to the object and the other end of each of the optical waveguides is coupled into each of the CCD elements;
    the compact optical scanner being constructed such that the substrate is made from a polymer;
    the core material of each of the optical waveguides is a polymer having a refractive index higher than that of the polymer of the substrate;
    each of the optical waveguides has two bent portions having a bending angle of 90 degrees; and
    each of the optical waveguides is vertically arranged on the substrate face opposite to the object and the face with aligned CCD elements at both ends of each of the optical waveguides.

In accordance with a twelfth construction of the present invention, the above third object can be also achieved by a compact optical scanner for scanning the image of an object while this object image is inputted and read;

the compact optical scanner comprising:
    a substrate having a face opposite to the object to input the object image and a face with aligned CCD elements for reading the object image; and
    plural optical waveguides for transmitting the inputted image to the CCD elements and arranged within a substrate such that one end of each of the optical waveguides is arranged on the substrate face opposite to the object and the other end of each of the optical waveguides is coupled into each of the CCD elements;
    the compact optical scanner being constructed such that the substrate is made from a polymer;
    the core material of each of the optical waveguides is a polymer having a refractive index higher than that of the polymer of the substrate;
    each of the optical waveguides has two bent portions having a bending angle greater than 62.1 degrees and less than 117.9 degrees; and
    each of the optical waveguides is vertically arranged on the substrate face opposite to the object and the face with aligned CCD elements at both ends of each of the optical waveguides.

In accordance with a thirteenth construction of the present invention, a microlens integrated with the substrate is fabricated in alignment with the end portion of each of the optical waveguides on the substrate face opposite to the object.

In accordance with a fourteenth construction of the present invention, numerical apertures of the microlens and the polymer of the optical waveguides are set to be equal to each other.

In the eleventh construction of the present invention, plural optical waveguides for transmitting an inputted image to CCD elements are included within a substrate formed by a polymeric material. Each of the waveguides is constructed from a polymer having a refractive index higher than that of the polymeric material of the substrate. Each of the waveguides has two bent portions having a bending angle of 90 degrees and is vertically arranged on a substrate face opposite to an object and a face with aligned CCD elements at both ends of each of the waveguides. Accordingly, even when the image reduction ratio is large, the distance between the object and a detector can be made small.

In accordance with the twelfth construction of the present invention, plural optical waveguides for transmitting an inputted image to CCD elements are included within a substrate formed by a polymeric material. Each of the waveguides is constructed from a polymer having a refractive index higher than that of the polymeric material of the substrate. Each of the waveguides has two bent portions having a bending angle greater than 62.1 degrees and less than 117.9 degrees. Each of the waveguides is vertically arranged on a substrate face opposite to an object and a face with aligned CCD elements at both ends of each of the waveguides. Accordingly, even when the image reduction ratio is large, the distance between the object and a detector can be made small.

In accordance with the thirteenth construction of the present invention, a microlens integrated with the substrate is fabricated in alignment with the end portion of each of the optical waveguides on the substrate face opposite to the object so that each image portion can be reliably converged to each of the waveguides.

In accordance with the fourteenth construction of the present invention, numerical apertures of the microlens and the polymer of each of the optical waveguides are set to be equal to each other. Accordingly, it is ensured that only light scattered from a scanned image portion is incident on each of the waveguides.

In accordance with a fifteenth construction of the present invention, the above fourth object can be achieved by a waveguide type reduction type image sensor fabricated using a polymeric optical waveguide and comprising a groove which is adjacent to the outer side of the bent portion of the waveguide and is filled with a substance having a refractive index lower than that of each of the core portion and the clad portion of the waveguide.

In accordance with a sixteenth construction of the present invention, the groove is filled with a gas.

In accordance with a seventeenth construction of the present invention, the groove has a width equal to or narrower than 2 μm.

In accordance with an eighteenth construction of the present invention, the interval between the groove and the core portion of the waveguide is equal to or smaller than 2 μm.

In accordance with a nineteenth construction of the present invention, the difference in refractive index between materials of the clad portion and the core portion of the waveguide is smaller than 1.5%.

In accordance with a twentieth construction of the present invention, the above fifth object can be achieved by a manufacturing method of a waveguide type reduction type image sensor comprising the steps of:

making the patterned face of a patterned substrate come in close contact with a plane substrate;

the patterned substrate being constructed such that the patterned substrate has a first groove as a capillary which is open at both ends or one end thereof and having a bent portion and has a second groove sealed at both ends and adjacent to the outer side of the bent portion;

filling the first groove with a monomer solution as the raw material of the core of an optical waveguide by capillary action; and forming the optical waveguide by polymerizing the monomer solution.

In the waveguide type reduction type image sensor of the fifteenth construction, the groove is adjacent to the outer side of the bent portion of each of optical waveguides and is filled with a substance having a refractive index lower than that of each of the core portion and the clad portion of each of the waveguides. Therefore, it is possible to reduce light loss caused when light is transmitted through the bent portion of each of the waveguides. Accordingly, light transmittance of the waveguides can be increased.

In the waveguide type reduction type image sensor of the sixteenth construction, the groove adjacent to the outer side of the bent portion is filled with a gas. When the groove is filled with a material having a constant refractive index, the groove can be easily filled with the gas by manufacturing this image sensor within a gaseous environment.

In the waveguide type reduction type image sensor of the seventeenth construction, the groove has a width equal to or narrower than 2 μm. Accordingly, light loss in the bent portion can be effectively reduced when the waveguide is made compact.

In the waveguide type reduction type image sensor of the eighteenth construction, the distance between the groove and the core portion of the waveguide is set to be equal to or smaller than 2 μm. Accordingly, light loss in the bent portion can be effectively reduced when the waveguide is made compact.

In the waveguide type reduction type image sensor of the nineteenth construction, the difference in specific refractive index between materials of the core portion and the clad portion of the waveguide is set to be equal to or smaller than 1.5%. Accordingly, light loss in the bent portion can be further effectively reduced when sizes, etc. of the waveguide and the groove are set to be equal to each other.

In the twentieth construction of the manufacturing method of the waveguide type reduction type image sensor, the capillary for the optical waveguide and the groove adjacent to the bent portion of this waveguide are formed in the substrate by photolithography, etc. This substrate comes in close contact with the plane substrate. Only the interior of the capillary is filled with the monomer solution by capillary action. The groove is filled with a gas during the close contact process. Accordingly, the optical waveguide and the groove can be easily filled with respective materials having different refractive indexes.

Further objects and advantages of the present invention will be apparent from the following description of the preferred embodiments of the present invention as illustrated in the accompanying drawings.

Figure 8:
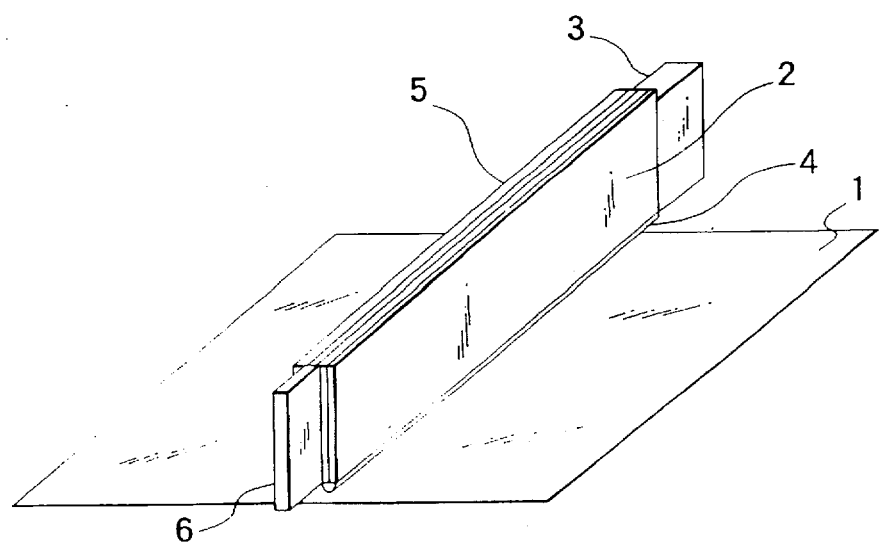
FIG. 8 is a view showing the construction of a waveguide type image sensor in accordance with the first embodiment of the present invention.
Figure 14A:
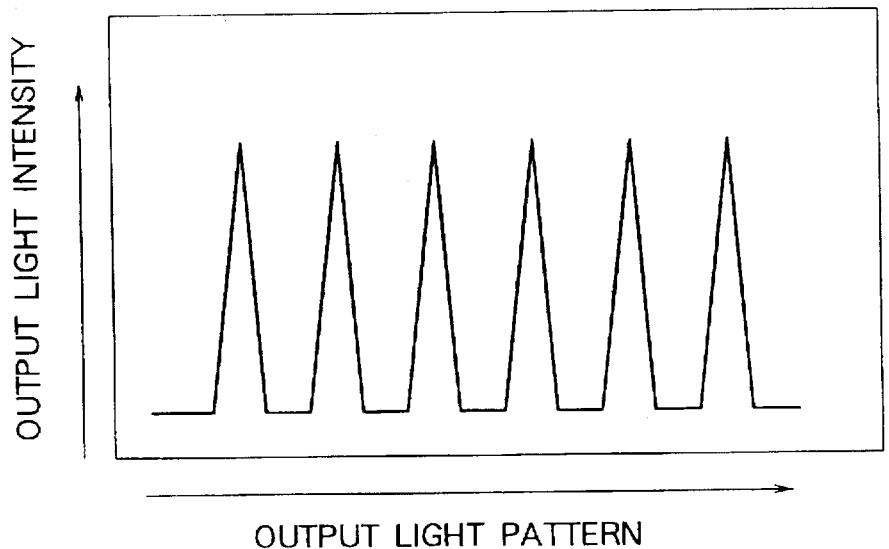
Figure 14B:
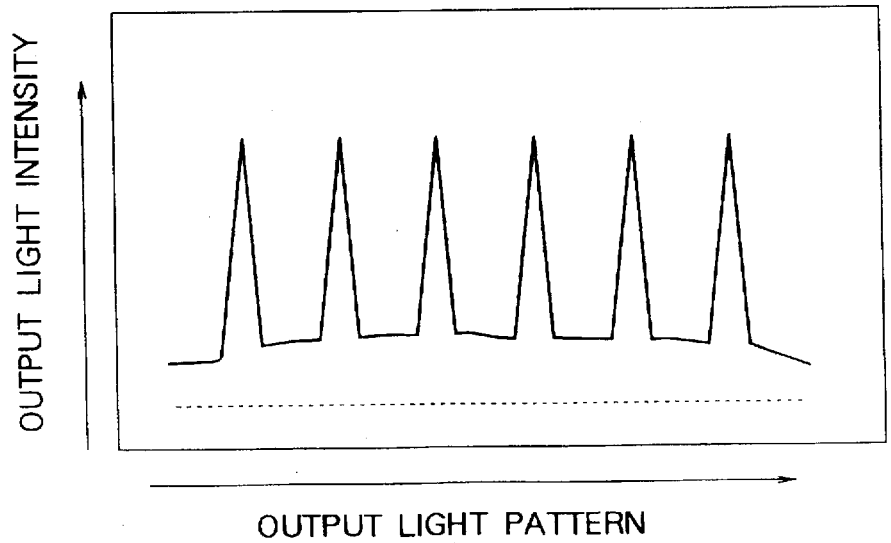
Figure 15:
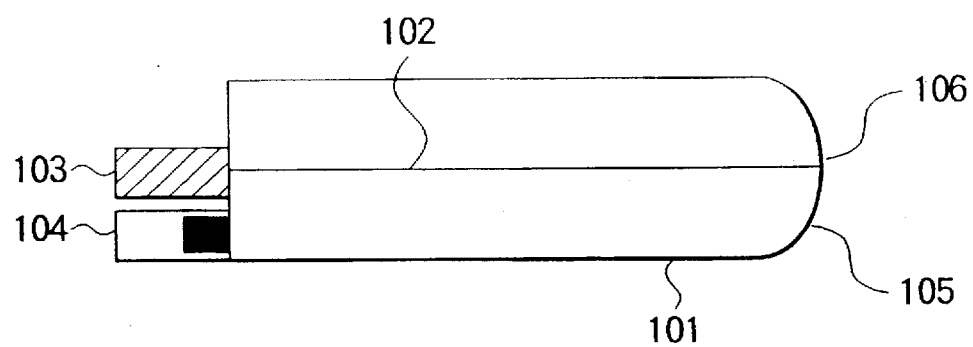
Figure 16:
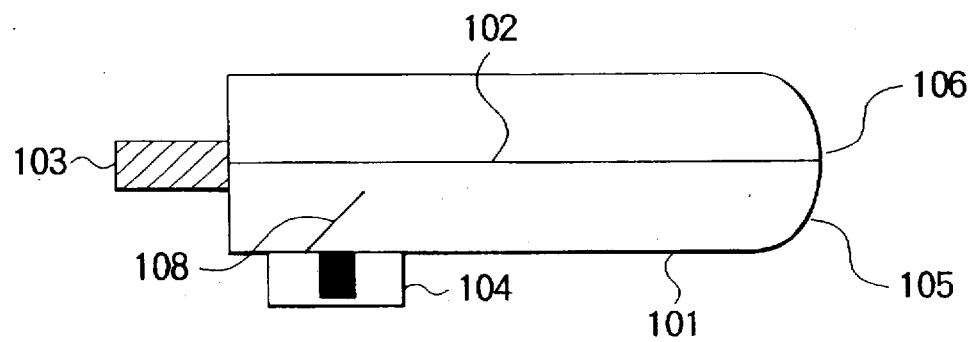
Figure 17:
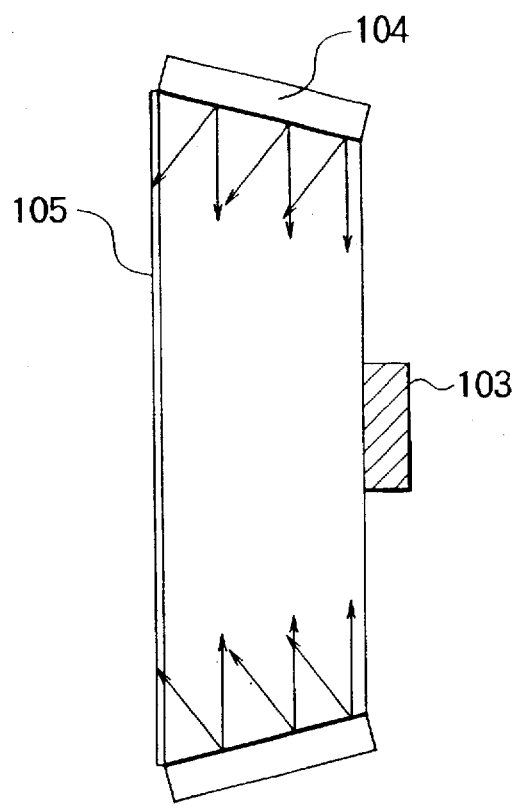
Figure 18:
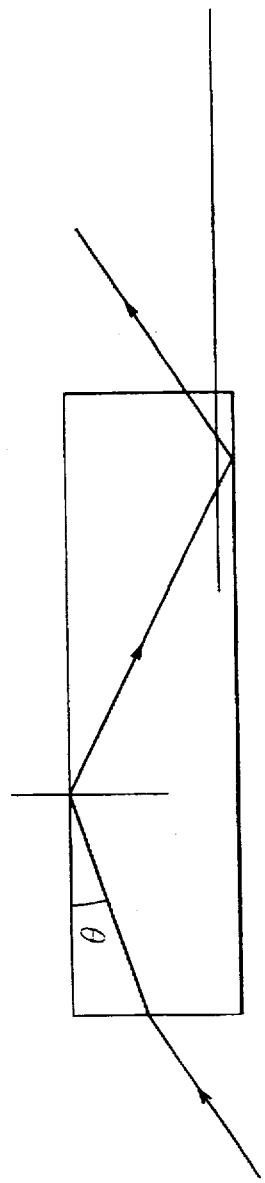
Figure 19A:
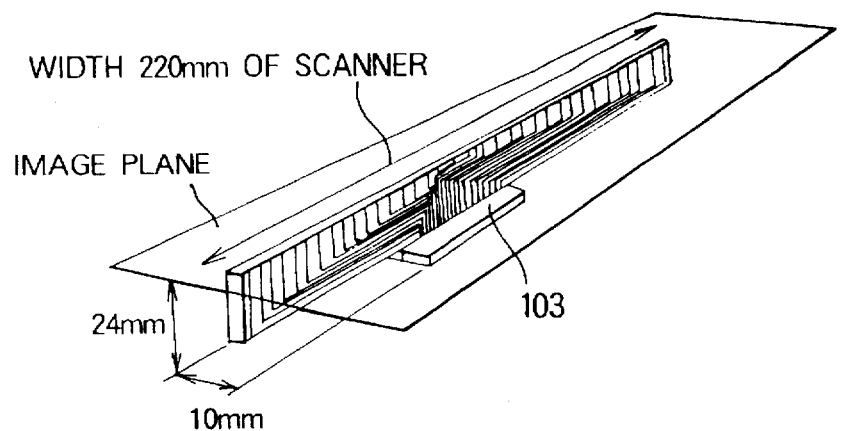
Figure 19B:
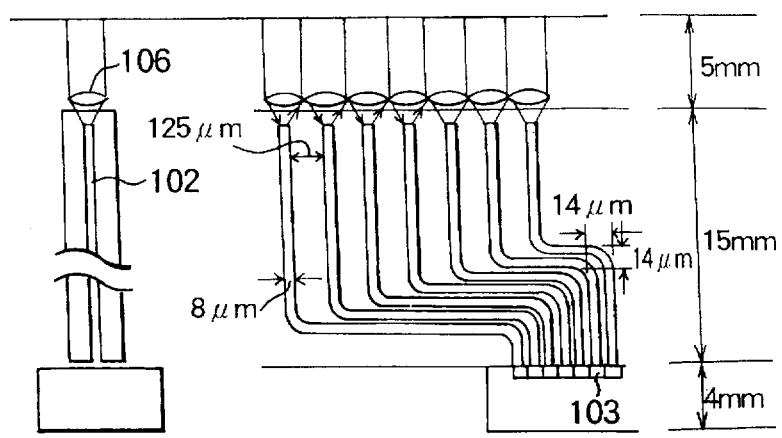
Figure 20:
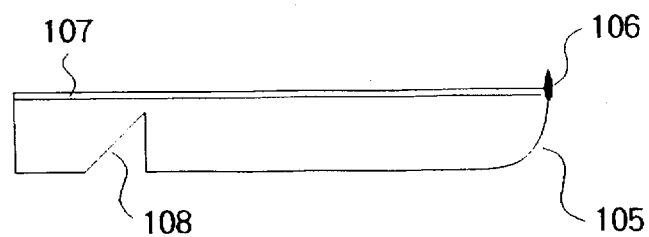
Figure 22A:
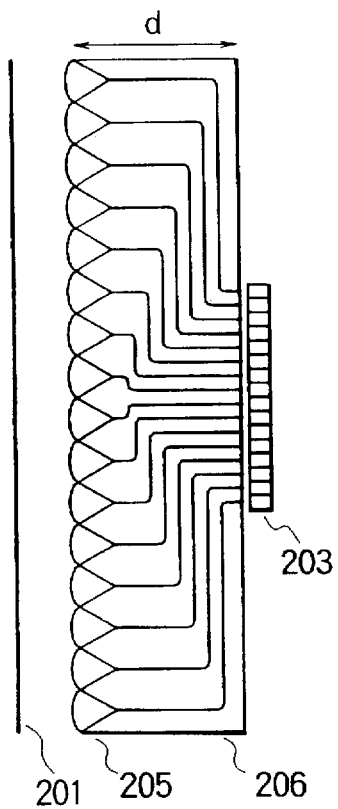
Figure 22B:
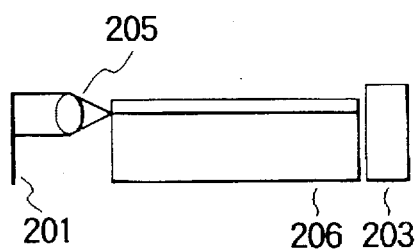
Figure 22C:
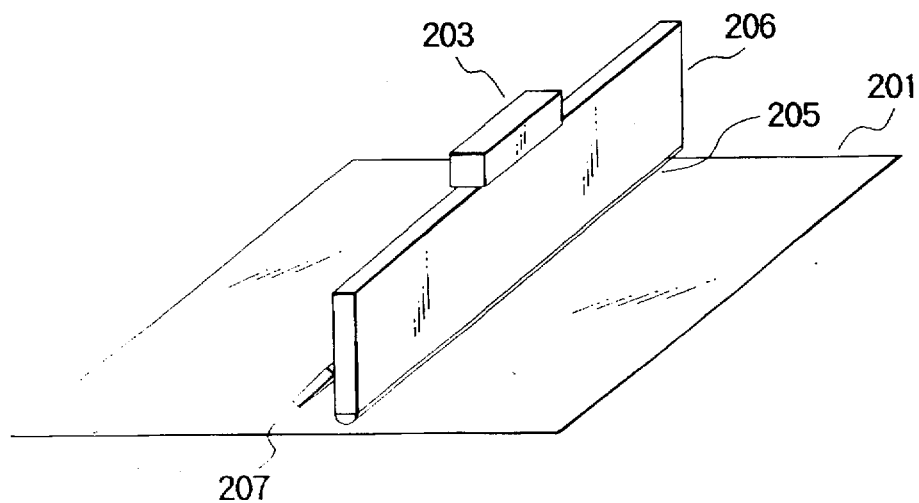
Figure 23A:
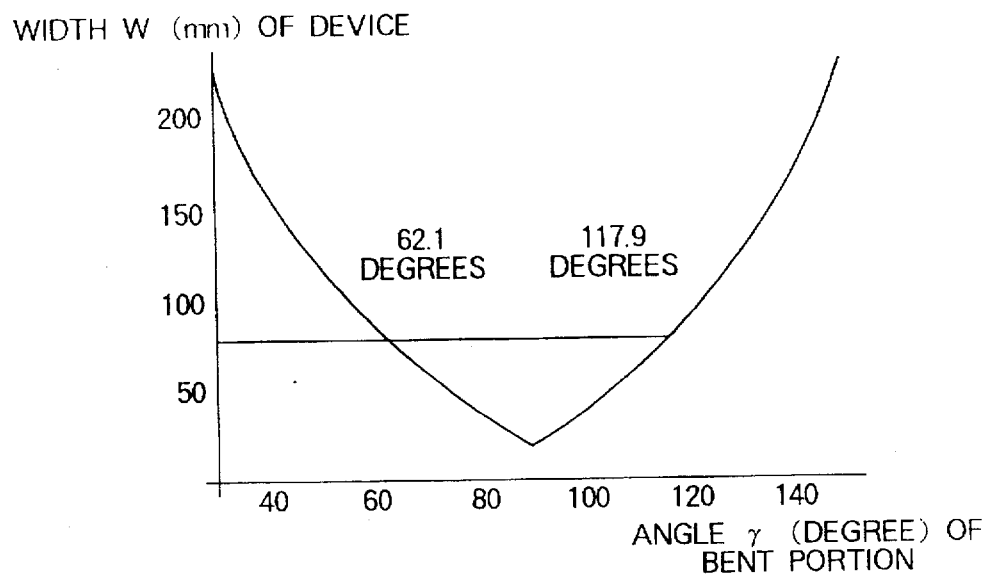
Figure 23B:
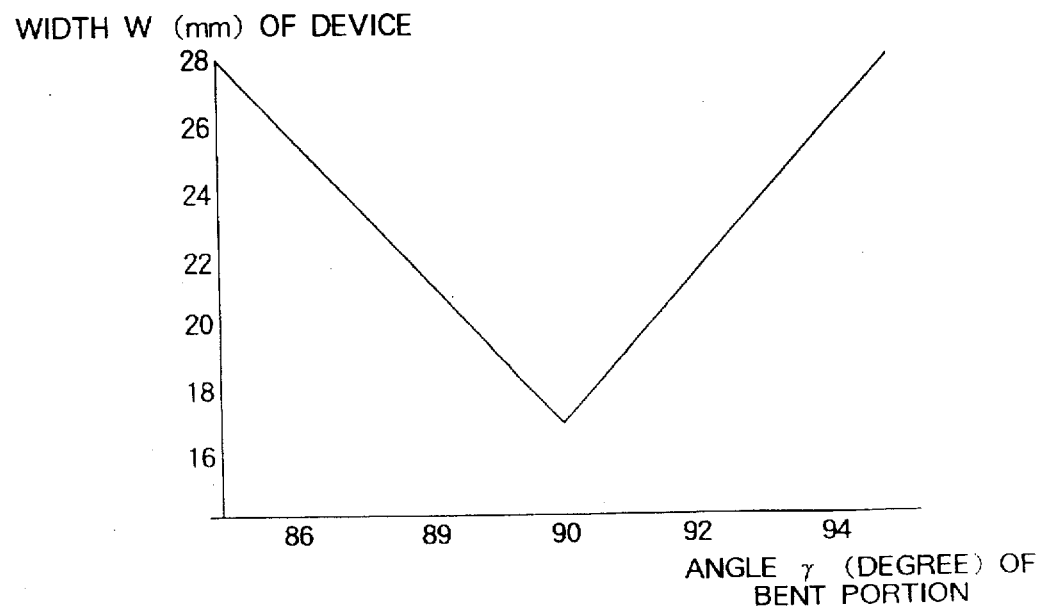
Figure 24:
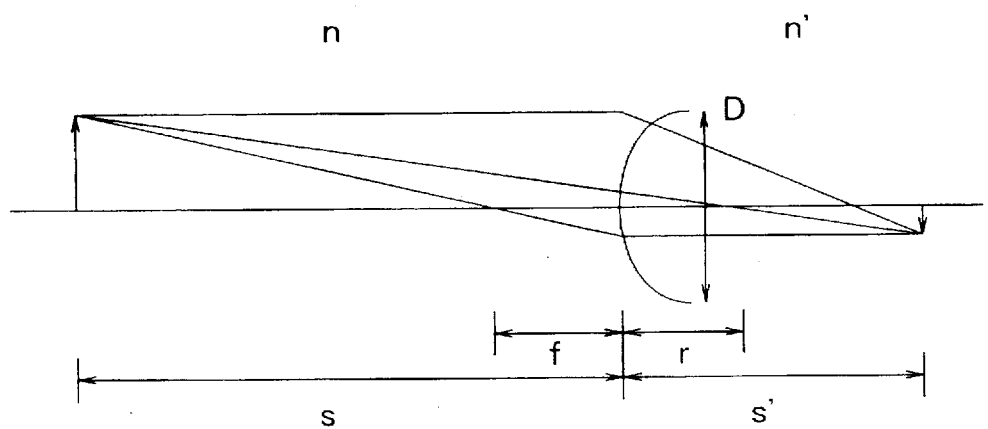
Figure 25A:
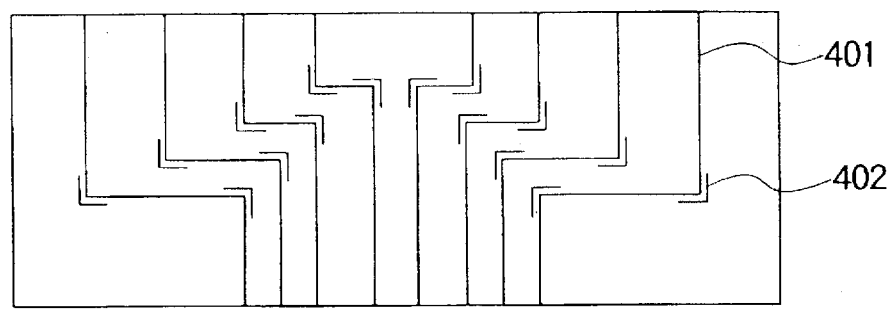
Figure 25B:
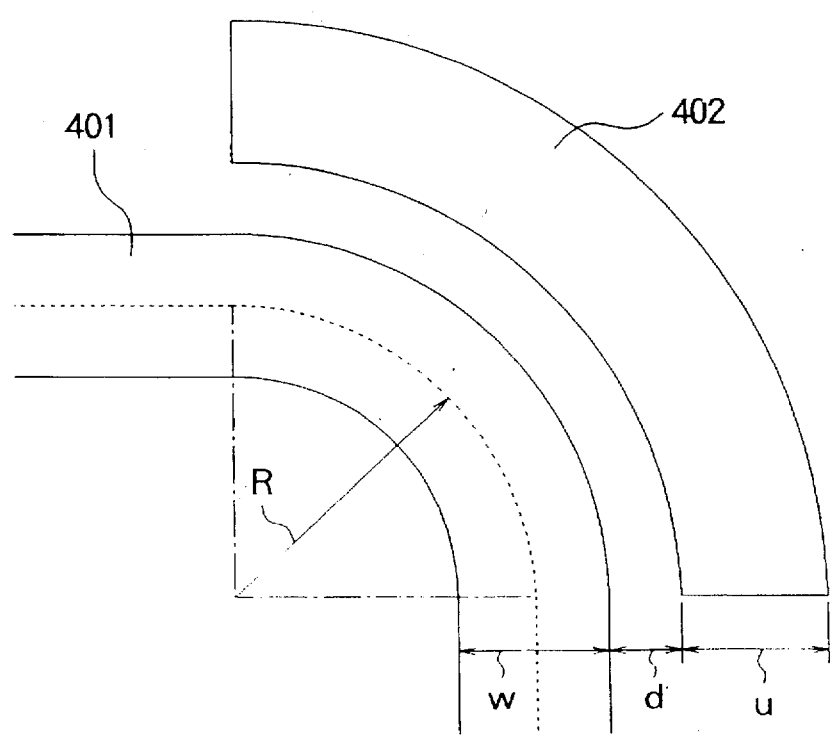
Figure 27A:
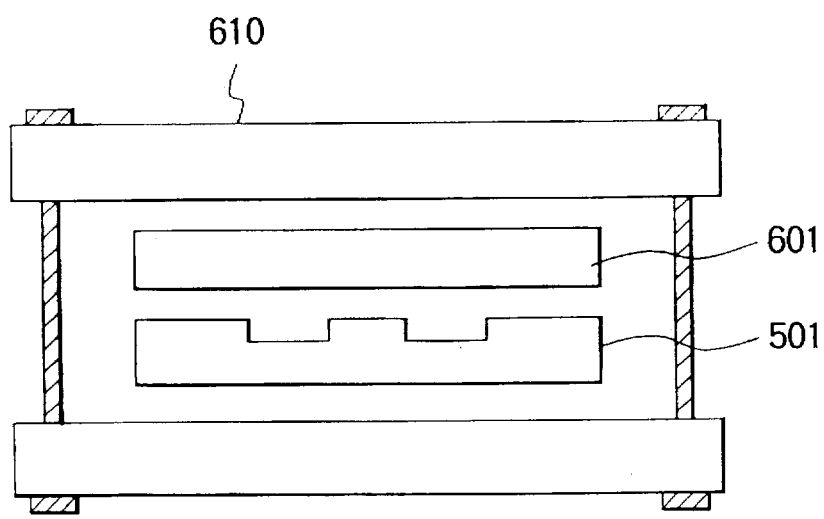
Figure 27B:
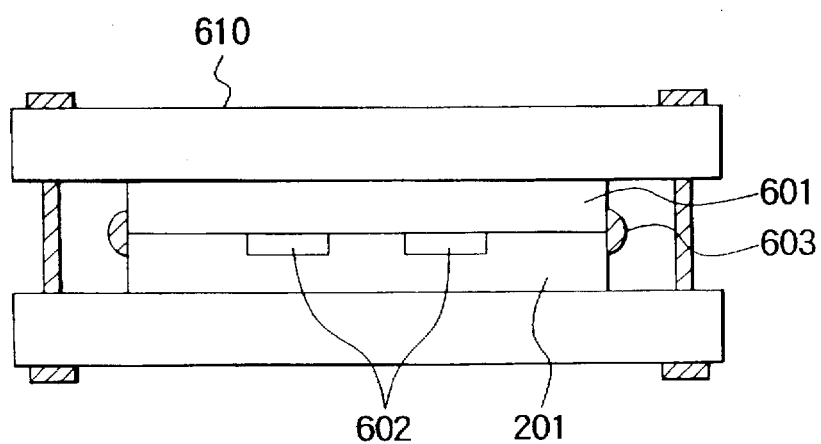
Figure 28A:
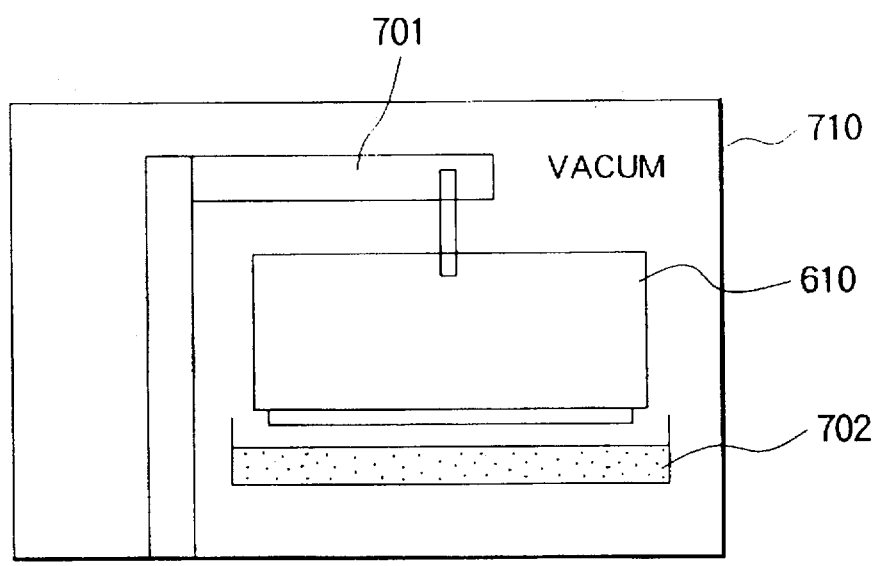
Figure 28B:
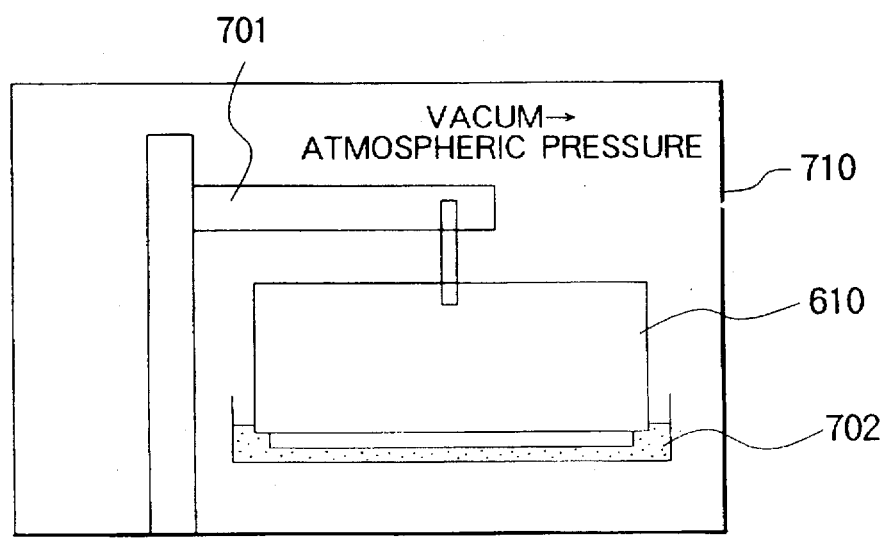
Figure 29:
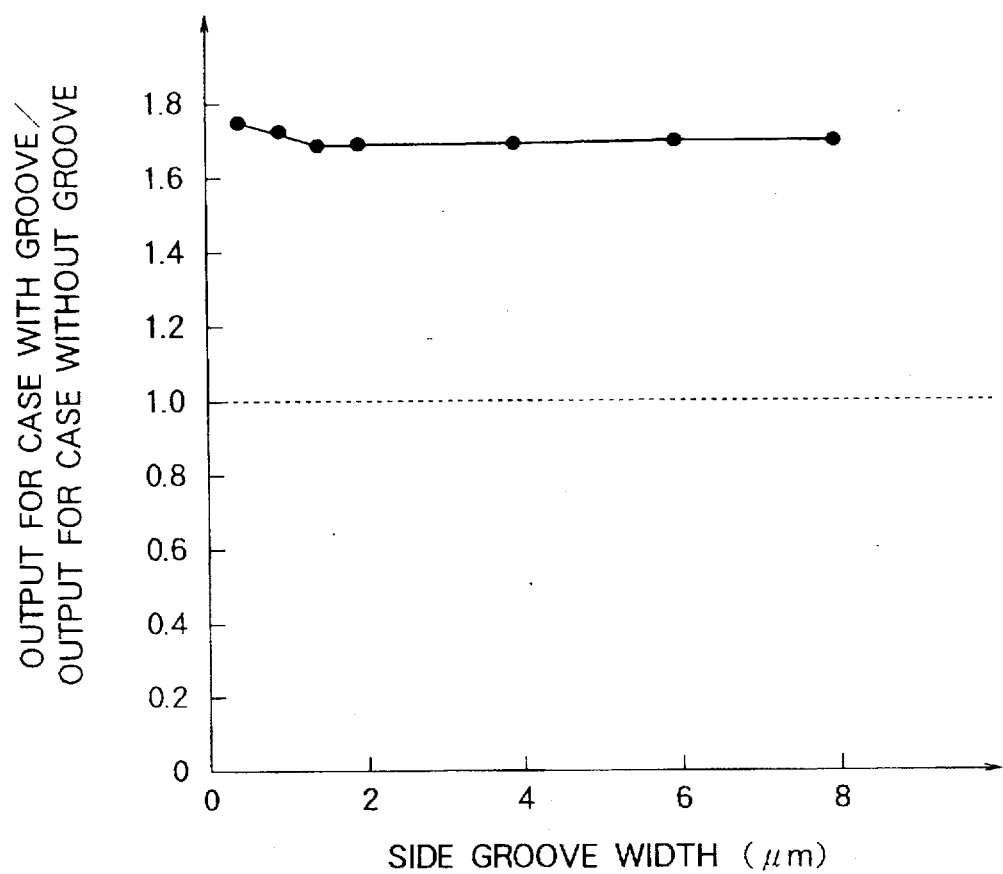
Figure 30:
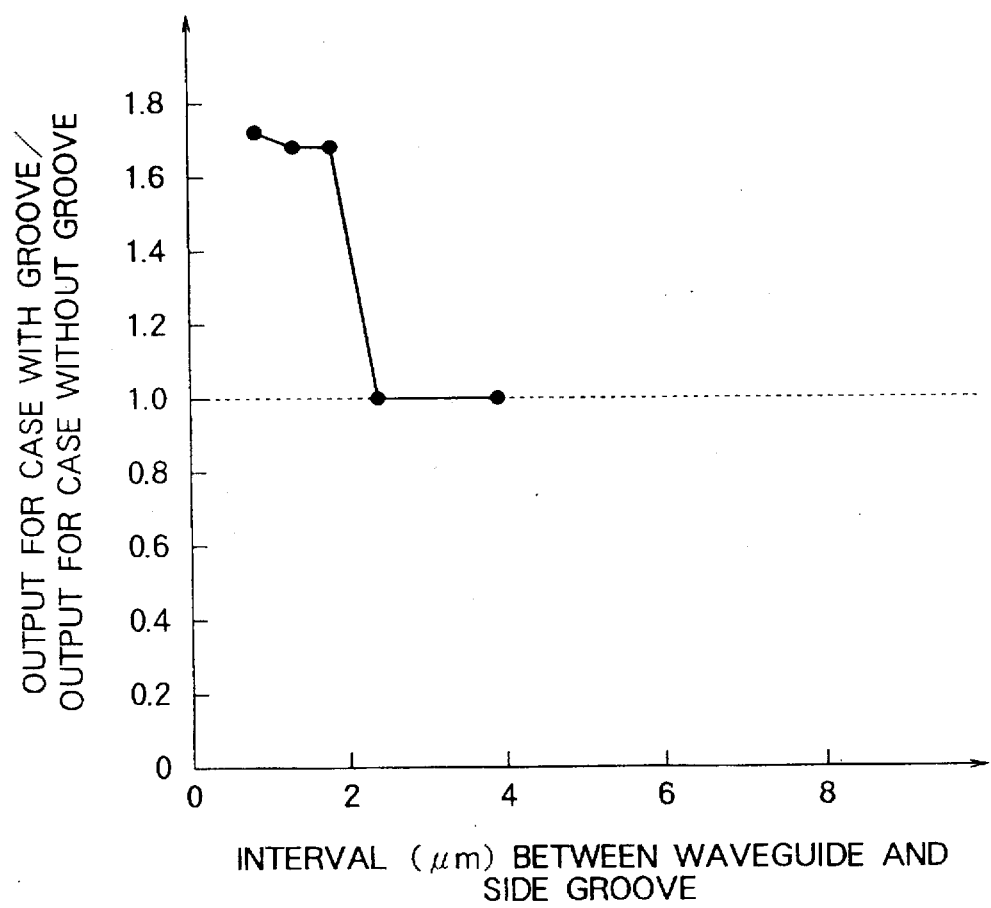
Figure 31:
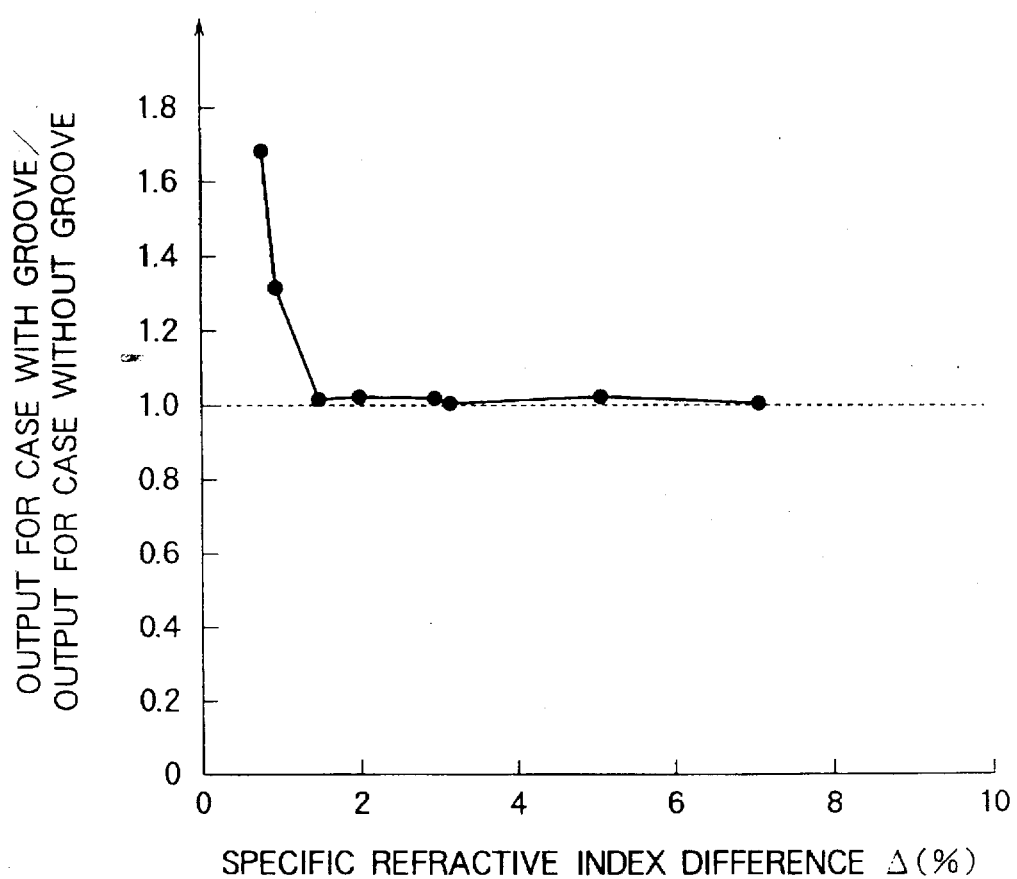

each of FIGS. 14a and 14b is a graph showing the emitted light pattern from the photodetecting section of FIG. 8;

FIG. 15 is a cross-sectional view showing one example of the construction of an image sensor in the present invention;

FIG. 16 is a cross-sectional view showing another example of the construction of the image sensor in the present invention;

FIG. 17 is a cross-sectional view showing another example of the construction of the image sensor in the present invention;

FIG. 18 is a view showing travel of light within a substrate of the image sensor in the present invention;

each of FIGS. 19a and 19b is a view showing another example of the construction of the image sensor in the present invention;

FIG. 20 is a cross-sectional view showing one example of the construction of the substrate of the image sensor in the present invention;

FIGS. 21a to 21f are views showing a manufacturing method of the waveguide section of the image sensor in the present invention;

FIG. 22a to 22c are views showing an optical scanner in accordance with another embodiment of the present invention;

each of FIGS. 23a and 23b is a graph showing the relation between the bending angle of a bent portion of a waveguide in the optical scanner of FIG. 22 and the width of this optical scanner;

FIG. 24 is a view for explaining the operation of a microlens arranged in the optical scanner of FIGS. 22a to 22c;

FIGS. 25a and 25b are views showing a waveguide type reduction type image sensor in accordance with another embodiment of the present invention;

FIGS. 26a to 26e are views showing the first stage for manufacturing waveguides shown in FIGS. 25a and 25b;

FIGS. 27a and 27b are views showing the second stage for manufacturing the waveguides shown in FIG. 25a and 25b;

FIGS. 28a and 28b are views showing the third stage for manufacturing the waveguides shown in FIGS. 25a and 25b;

FIG. 29 is a graph showing the reducing effects of light loss with respect to the width of a groove arranged outside a bent portion of each of the waveguides;

FIG. 30 is a graph showing the reducing effects of light loss with respect to the distance between a waveguide core portion and the groove arranged outside the bent portion of the waveguide core portion; and FIG. 31 is a graph showing the reducing effects of light loss with respect to the difference in specific refractive index between the waveguide core portion and the material of a clad portion.

DESCRIPTION OF THE PREFERRED EMBODIMENTS

The preferred embodiments of a waveguide type reduction type image sensor and a manufacturing method thereof will next be described in detail with reference to the accompanying drawings.

Each of the following embodiments is an example in which the present invention is applied to a one-dimensional image sensor (having a scan width of 256 mm corresponding to paper sheet B4) for a G3 type facsimile machine having a resolution of 200 dpi. A photoelectric converting element of type μPD3743D manufactured by Nippon Denki (NEC) Co., Ltd. in Japan and having a pitch of 14 μm and 2048 pixels.

FIG. 8 is a view for explaining the construction of a waveguide type reduction type image sensor in accordance with the first embodiment of the present invention. The waveguide type image sensor of FIG. 8 is constructed with a waveguide type photodetecting section and a waveguide type linear light source.

Figure 9:
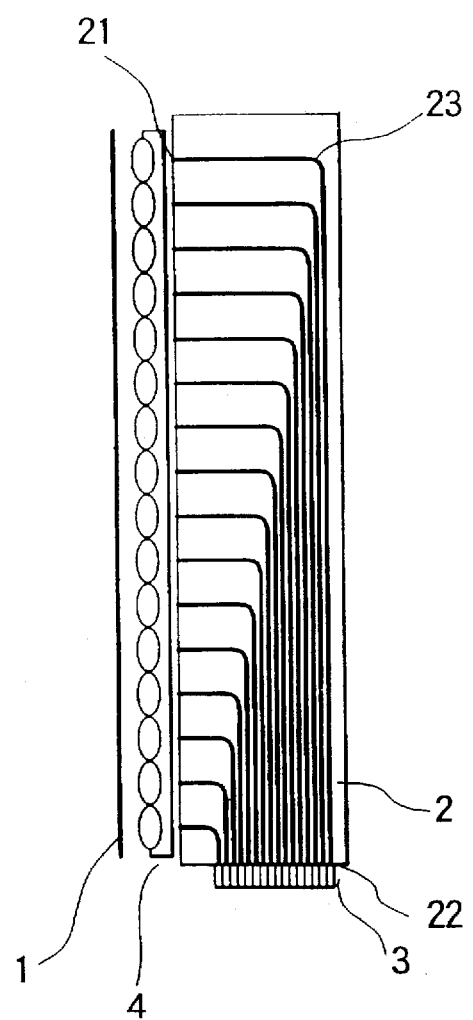
FIG. 9 is a plan view showing the construction of a photodetecting section of the waveguide type image sensor shown in FIG. 8.

FIG. 9 is a plan view showing the construction of the waveguide type photodetecting section of the image sensor shown in FIG. 8. The photodetecting section is constructed with a microlens array 4, an optical waveguide substrate 2 and a CCD (charge coupled device) array 3. The microlens array 4 converges reflected light from an original 1 onto the incident face of the optical waveguide substrate 2. The optical waveguide substrate 2 has an optical waveguide for guiding the converged light to the CCD array 3. The CCD array 3 is a photoelectric converting element for converting the guided light to an electric signal and outputting this electric signal.

The optical waveguide substrate 2 is 270 mm×25 mm×2 mm in size and has 2048 waveguides. The pitch of the respective waveguides on the incident end face 21 is 127 μm. The waveguides are formed in the shape of a character L such that the waveguides are perpendicular to the incident face 21 and the emitting face 22 which is perpendicular to this incident face 21. The pitch of the respective waveguides on the emitting end face is 14 μm. The core portion of the waveguides is formed in a rectangular shape 8 μm in width and 8 μm in depth. The radius of curvature of the bent portion 23 of each of the waveguides is 2 mm.

Each of the waveguides is manufactured by a capillary method shown in Japanese Patent Application Laying Open (KOKAI) 6-300807.

For example, PMMA (polymethyl methacrylate) is used as a waveguide substrate material (a waveguide clad portion). Further, DAI (diallyl isophthlalate) having a refractive index larger than that of PMMA is used as a waveguide core material.

Firstly, a rectangular waveguide groove having 8 μm in width and 8 μm in depth is formed on the substrate having the above pattern by an injection moulding method so that a patterned substrate is manufactured. Next, as shown in FIGS. 27a and 27b, the patterned substrate and a plane substrate (a PMMA substrate) are clamped by a jig such that a waveguide face side of the patterned substrate comes in close contact with the plane substrate.

The waveguide groove is filled with a monomer solution using a DAI monomer including 5% of benzoyl peroxide. The clamped substrate and the monomer solution are placed within a vacuum chamber. Gases are discharged from the interior of the vacuum chamber until a vacuum degree of $10^{-4}$ Torr is achieved. Thus, degassing processing of the DAI monomer solution is performed. Thereafter, one open end of the above clamped substrate is dipped into the monomer solution. Then, the interior of the vacuum chamber is leaked such that the pressure within the vacuum chamber is gradually changed from a vacuum to atmospheric pressure. Thus, the waveguide groove is filled with the monomer solution. Thereafter, the clamped substrate is heated for six hours at a temperature of 85° C. by an oven so that the DAI monomer solution is polymerized. Then, the clamped substrate is detached from the clamp jig and the incident end face and the emitting end face of the clamped substrate are polished so that an optical waveguide substrate is manufactured.

With respect to the polymeric optical waveguide manufactured in this first embodiment, the PMMA polymer has a refractive index of 1.49 and the DAI has a refractive index of 1.59. Accordingly, a numerical aperture (NA) of this optical waveguide is estimated as 0.55 from the following formula.

$$NA=((n(core))^2-n(clad)^2)^{1/2}$$

Propagating loss of this waveguide is about 0.1 dB/cm.

Similar to the waveguide pitch, the microlens array 4 is constructed such that 2048 microlenses having 127 μm in diameter are arranged in a linear shape over a length of 256 mm (an original width of sheet size B4).

It is theoretically known that 84% of the entire amount of parallel light incident on a microlens is converged in the shape of a disc having a diameter w and shown by the following formula (1).

$$w=1.22\lambda/NA \tag{1}$$

Here, NA is the numerical aperture of the above microlens and λ is a wavelength of light and is set to 570 nm. The microlens is 0.15 in NA so that light is converged to a spot size, w, of 4.6 μm in diameter. The glass substrate used in the microlens is 0.45 mm in thickness such that light is converged onto the incident end face of the optical waveguide substrate.

As mentioned above, the numerical aperture (NA) of the microlens is 0.15 and the NA of the waveguide is 0.55.

Accordingly, there is no light coupling loss caused by mismatching of the numerical apertures (NAs) so that reflected light from an original face can be ideally coupled into the waveguide by the microlens.

The above optical waveguide substrate 2, the microlens array 4 and the CCD array 3 are adhered to each other through an optical adhesive having a refractive index close to that of this substrate so that a photodetecting section is manufactured. For example, this optical adhesive is an ultraviolet ray curing type LA-3556 manufactured by Toyo Ink Seizo Co., Ltd.

Figure 4:
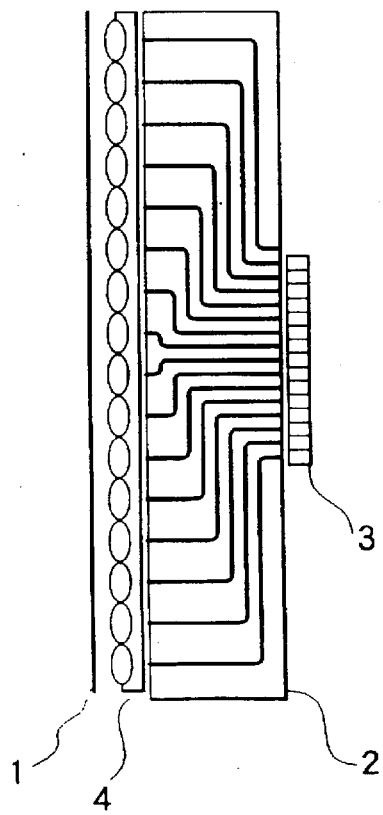
FIG. 4 is a plan view showing the construction of the waveguide type reduction type image sensor shown in FIG. 3.
Figure 5:
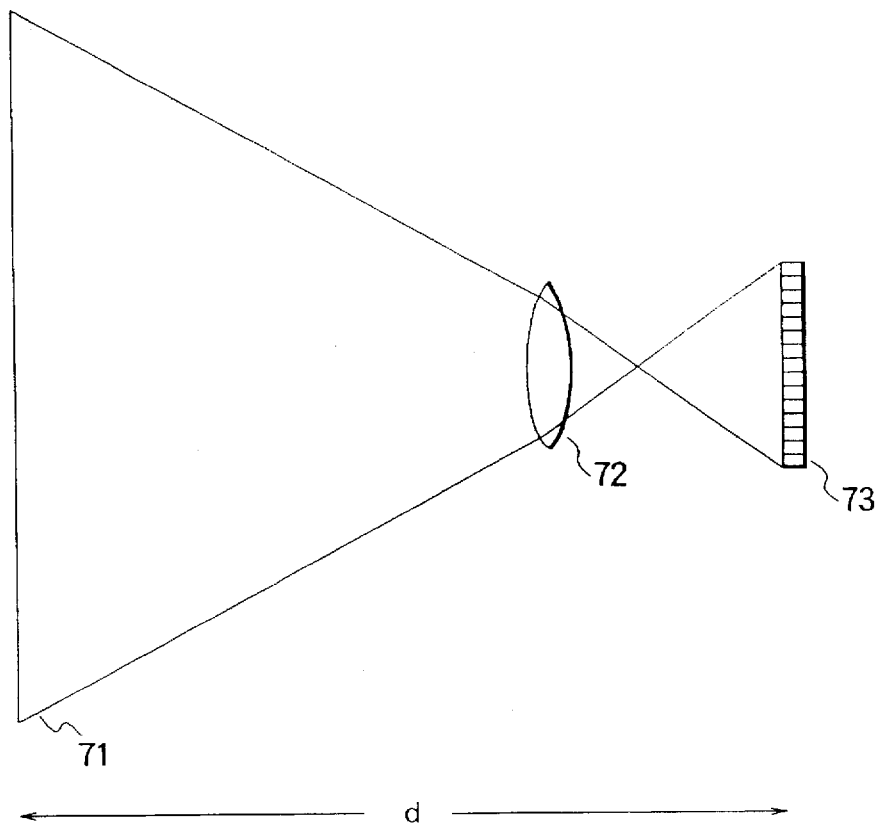
FIG. 5 is a schematic view showing the construction of a general optical scanner.
Figure 6:
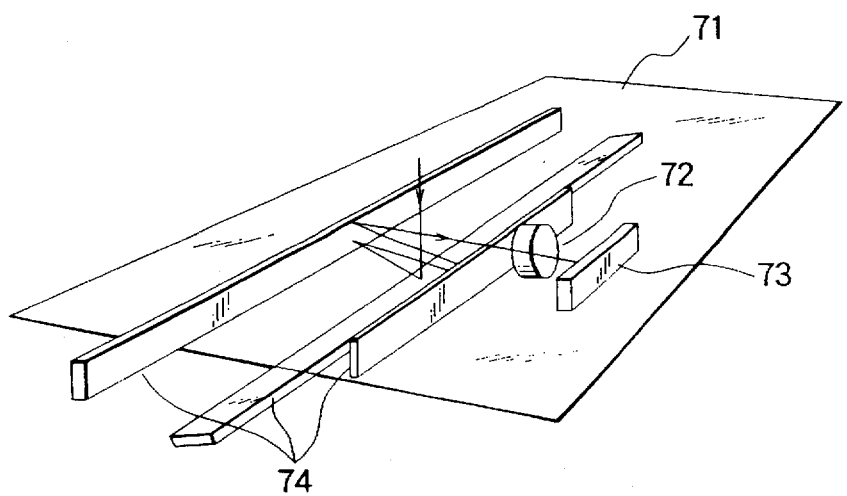
FIG. 6 is a view for explaining the operation of an optical system used in the general optical scanner.
Figure 7:
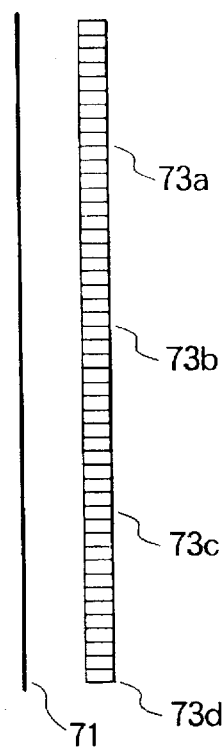
FIG. 7 is a view showing detectors arranged in the general optical scanner.

FIGS. 14a and 14b show measured results of the waveguide output light pattern to verify effects of the photodetecting section in the above first embodiment. The light source uses a general LED array and the reflected light of a white original is detected. FIG. 14a shows the output light pattern of the photodetecting section in the present invention. FIG. 14b shows the output light pattern of a general type photodetecting section shown in FIG. 4. The general type photodetecting section has a large noise level and a small C/N (carrier/noise) ratio. In contrast to this, the photodetecting section in the first embodiment has a peak intensity of signal light equal to that of the general type, but has a low noise level so that a large C/N ratio is obtained in comparison with the general type. The noise level in the general type is high because of stray light caused by waveguide uncoupled light from the light source, etc. In the photodetecting section of the present invention, influences of the above stray light can be reduced so that the C/N ratio is improved. Accordingly, it should be understood that the photodetecting section of the present invention is effective -to improve a S/N (signal/noise) ratio.

Figure 11:
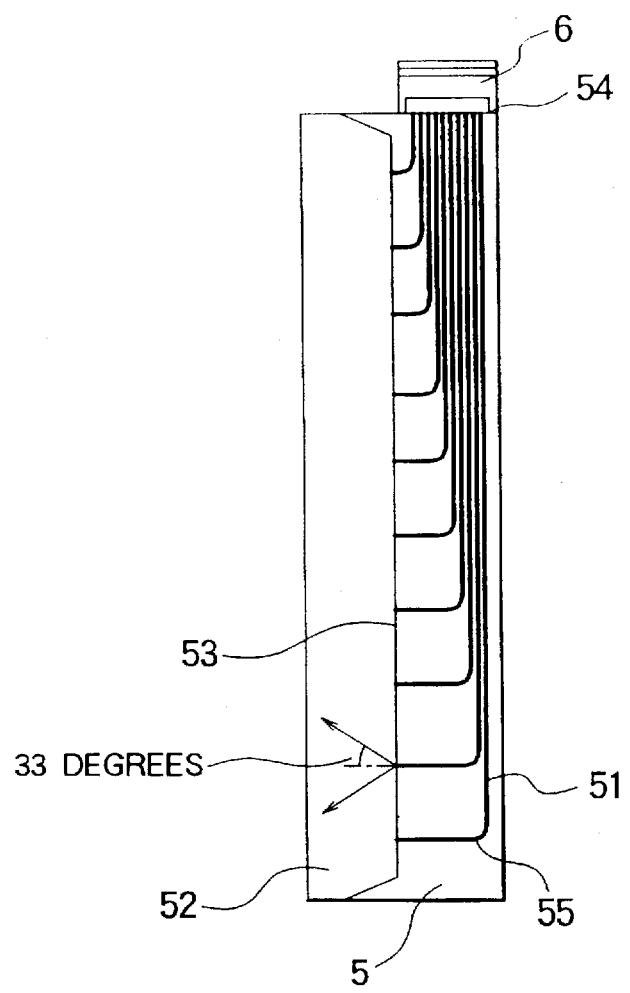
FIG. 11 is a plane view showing the construction of a waveguide type light source shown in FIG. 8.
Figure 12A:
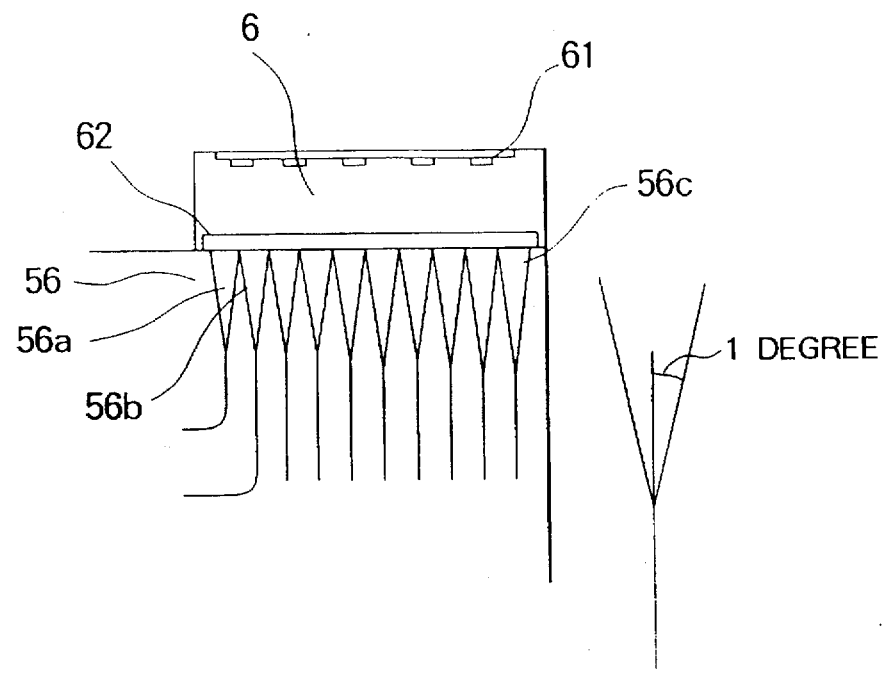
FIGS. 12a and 12b are views showing the waveguide type light source of FIG. 8 in detail.
Figure 12B:
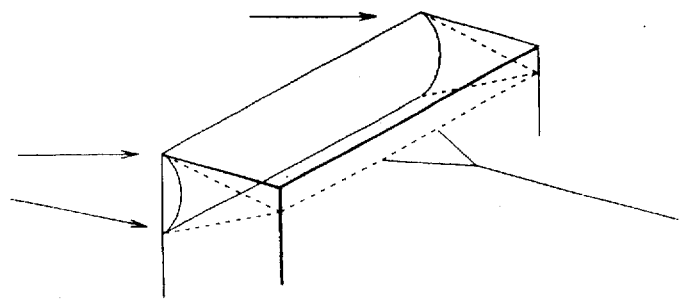

FIG. 11 is a plan view showing the construction of the waveguide type linear light source. Each of FIGS. 12a and 12b is an enlarged view showing a structure around the light source portion 6. The waveguide type linear light source is constructed with the light source portion 6 and an optical waveguide substrate 5 composed of waveguides and a planar waveguide.

The optical waveguide substrate 5 is 270 mm×30 mm×2 mm in size and is constructed by plural L-shaped waveguides 51 and a planar waveguide 52 formed along an original face width (260 mm).

Each of the L-shaped waveguides 51 has a planar waveguide coupling portion 53 and a waveguide 55 bent 90 degrees such that the waveguide 55 is perpendicular to an LED light incident face 54. In the first embodiment, 13 L-shaped waveguides are formed at an interval of 20 mm at the emitting end (in a planar waveguide coupling portion). Further, tapered waveguides 56 are formed on the incident side such that each of the tapered waveguides 56 is wide on its incident end face and is narrow at its L-shaped waveguide coupling end. The widening angle of a tapered portion of each of the tapered waveguides 56 is set to one degree. Here, similar to the photodetecting section, each of the plural L-shaped waveguides is formed with a rectangular shape 8 μm×8 μm in size.

The L-shaped waveguides have different lengths so that light losses until the planar waveguide coupling portions are different from each other. Therefore, when the same light amount is waveguided, the emitted light amount is changed depending on a waveguide length. An open width d1 on an end face of each of the tapered waveguides is set to be narrow with respect to a waveguide located near the light source and having a small propagating loss in the L-shaped waveguides, and is set to be wide with respect to a long L-shaped waveguide such that the light amount in the planar waveguide coupling portion is constant for a uniform irradiated light amount.

The open width d1 of a tapered waveguide can be designed from the L-shaped waveguide length and the waveguide propagating loss. For example, in the first embodiment, the open width is about 530 μm with respect to an L-shaped waveguide 56a nearest the light source and is about 550 μm with respect to an adjacent L-shaped waveguide 56b, and is about 920 μm with respect to a longest L-shaped waveguide 56c. The length of the tapered portion and a waveguide interval are respectively changed in accordance with the open width of the tapered waveguide and can be designed from the widening angle (one degree on one side) of the tapered portion and the waveguide open width. For example, in the first embodiment, the length of the tapered portion of the L-shaped waveguide 56a is 1.52 mm and the length of a tapered portion of the L-shaped waveguide 56b is 1.58 mm. Further, the waveguide interval is 540 μm.

As shown in FIG. 11, the planar waveguide 52 is formed such that the planar waveguide 52 has a waveguide coupling face width of 240 mm, an emitting end width of 260 mm and a width of 15 mm. Tapered portions are formed at both ends of the planar waveguide 52. As already mentioned above, 13 L-shaped waveguides are coupled into each other at an interval of 20 mm on the waveguide coupling face 53. Light from each of the L-shaped waveguides is emitted from the planar waveguide 52 at an angle of 33 degrees on one side. The planar waveguide width is designed such that the widening width of the L-shaped waveguide emitted light on the planar waveguide emitting face is 20 mm equal to the L-shaped waveguide interval to equalize the light amount on the planar waveguide emitting face. Accordingly, the planar waveguide width can be reduced by reducing the interval of the L-shaped waveguides coupled into the planar waveguide. Namely, the planar waveguide width can be reduced by increasing the number of waveguides. For example, if the waveguide interval is 10 mm and the number of waveguides is 26, the planar waveguide width can be set to about 7.5 mm.

The light source portion 6 is constructed from an LED array 61 having plural LEDs arranged in a linear shape and a cylindrical lens 62. The light source portion 6 is arranged on the incident end face of the optical waveguide substrate 5. FIGS. 12a and 12b are views showing the schematic construction of the incident face of the LED array. In the light source portion in the first embodiment, 5 LEDs are linearly arranged and light is converged in a stripe shape by the cylindrical lens having a numerical aperture of 0.15.

In the above construction, light from the light source portion is converged onto the incident face of the optical waveguide substrate having the tapered waveguides by the cylindrical lens. This light is waveguided along an L-shaped waveguide and is propagated within the planar waveguide at the widening angle determined by the waveguide numerical aperture (NA) so that this light is uniform. This light is then emitted from the end face of the planar waveguide.

Similar to the photodetecting section, the optical waveguide substrate is manufactured by the above-mentioned construction using the capillary method described in Japanese Patent Application Laying Open (KOKAI) No. 6-300807.

Distributions of illuminance (L) in the waveguide type light source in the first embodiment and the general LED array light source are measured for comparison. This general LED array light source has a structure in which 27 LEDs are linearly arranged at an equal interval. An illuminance deviation ΔL is defined by the following formula.

$$\Delta L = ((L_{MAX} - L_{MIN})/(L_{MAX} + L_{MIN})) \times 100$$

A maximum illuminance deviation in the general type is about 18%. In contrast to this, the maximum illuminance deviation in the waveguide type light source is about 10%. Accordingly, it should be understood that the irradiated light amount distribution is improved.

In the photodetecting section in the above first embodiment, it is possible to prevent a signal from being deteriorated as the uncoupled light is not incident on the photoelectric element. Further, a bent portion of the waveguide is formed in only one place in comparison with the construction of the waveguide type image sensor of FIG. 4 so that light loss in the waveguide bent portion can be reduced.

In accordance with the waveguide type light source in the above first embodiment, it is possible to obtain a linear light source having a small deviation in irradiated light amount and a uniform irradiated light amount. Further, the number of LEDs can be reduced so that power consumption of the image sensor can be reduced. Further, the image sensor can be made thin in comparison with the general light source in which LEDs are arranged at an equal interval. Accordingly, the image sensor can be made compact and light in weight by combining the light source with the waveguide type photodetecting section.

Further, it is not necessary to fabricate and adjust the light source by integrating the light source so that a manufacturing process of the image sensor can be simplified. Further, it is possible to provide an image sensor having excellent shock resistance.

Furthermore, an optical waveguide corresponding to a large original width can be easily manufactured at low cost by an ion diffusion method, an injection moulding method, etc.

A second embodiment of the waveguide type reduction type image sensor of the present invention will next be explained with reference to FIGS. 10 and 13, etc.

Figure 10:
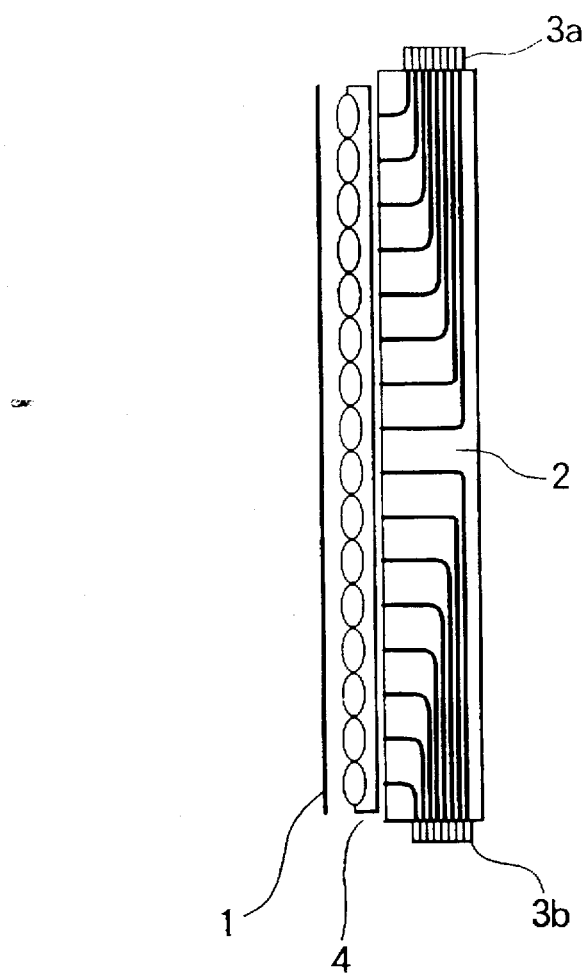
FIG. 10 is a plan view showing the construction of the photodetecting section in accordance with a second embodiment of the waveguide type image sensor in the present invention.
Figure 13:
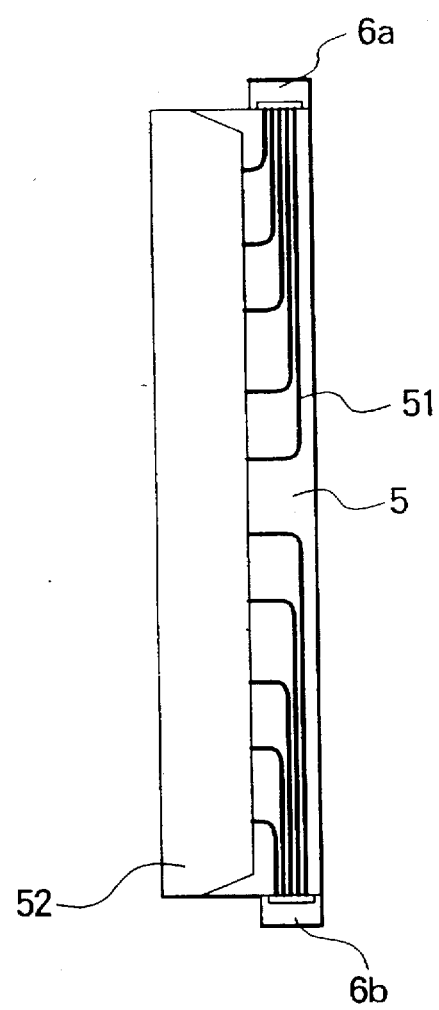
FIG. 13 is a plan view showing the construction of a waveguide type light source shown in FIG. 10.

Each of FIGS. 10 and 13 is a plan view for explaining the construction of the waveguide type reduction type image sensor in the second embodiment. FIG. 10 shows a photodetecting section in which a photoelectric converting element array is divided into two sections and 1024 waveguides are coupled into each of the divided sections. Thus, the width of a waveguide substrate can be reduced from 25 mm to 12.5 mm.

FIG. 13 shows a waveguide type light source. Similar to the photodetecting section, waveguides are divided by dividing a light source portion into two sections so that the width of a waveguide substrate can be reduced from 25 mm to 20 mm. Further, as mentioned in the first embodiment, the width of the waveguide substrate can be set to 17.5 mm if the number of waveguides is doubled and a coupling waveguide interval is set to 10 mm. The longest waveguide length can be also reduced by half by dividing the light source into two sections so that waveguide loss can be reduced by half.

As mentioned above, the waveguides can be divided in two directions so that the waveguide type reduction type image sensor can be made further compact.

No application of the present invention is limited to the above embodiments, but many modifications and changes of the present invention can be added to the above embodiments within the scope of the present invention.

As mentioned above, in a waveguide type reduction type image sensor having the first construction of the present invention, it is possible to prevent a signal from being deteriorated as the uncoupled light is not incident on the photoelectric element. Further, a bent portion of the optical waveguide is formed in only one place in comparison with the construction of a general waveguide type image sensor so that light loss in the waveguide bent portion can be reduced.

In a waveguide type reduction type image sensor having the second construction of the present invention, the construction of a photodetecting means is simplified and the cost of the waveguide reduction type image sensor can be reduced.

In a waveguide type reduction type image sensor having a third construction of the present invention, optical waveguides can be divided into right-hand and left-hand sections and can be arranged on the right-hand and left-hand sides. Accordingly, the width of an optical waveguide substrate can be reduced and the propagating loss of a longest waveguide can be reduced by half.

In a waveguide type reduction type image sensor having a fourth construction of the present invention, a light source means can be made compact and/or thin.

In a waveguide type reduction type image sensor having a fifth construction of the present invention, it is possible to obtain a uniform irradiated light intensity distribution and the light of a light emitting element can be efficiently used. Accordingly, the number of light emitting elements can be reduced and power consumption of the waveguide type reduction type image sensor can be reduced.

In a waveguide type reduction type image sensor having a sixth construction of the present invention, optical waveguides can be divided into right-hand and left-hand sections and can be arranged on the right-hand and left-hand sides. Accordingly, the width of an optical waveguide substrate can be reduced and the propagating loss of the longest waveguide can be reduced by half.

In a waveguide type reduction type image sensor having a seventh construction of the present invention, a photodetecting means and a light source means are integrated with each other so that the image sensor can be made compact. Further, since a coupling optical system, an optical waveguide substrate, a photoelectric converting element and a light source are integrated with each other, it is not necessary to adjust the image sensor so that the manufacturing process of the image sensor can be simplified and the image sensor has excellent shock resistance.

Further, the optical waveguides arranged in the optical waveguide substrate of the light source means/the photodetecting means in the present invention can be easily manufactured by an ion diffusion method, an injection moulding method, etc. such that each of the optical waveguides has an arbitrary size. Accordingly, an image sensor corresponding to an original width can be manufactured at low cost.

An LED array can be arranged in various kinds of forms. FIGS. 15 to 17 show different arrangements of an image sensor in which LEDs are attached to a waveguide substrate. Each of FIGS. 15 and 16 is a cross-sectional view of the substrate in its width direction. FIG. 17 is a cross-sectional view of the substrate in its longitudinal direction.

In FIG. 15, a CCD element 103 for reading an image is attached to the rear portion of the substrate shown on the left-hand side. Further, an LED 104 as a light source is directly attached to this rear portion of the substrate. Light outputted from the LED is directly coupled into the substrate and travels along the substrate while this light is reflected many times within the the substrate as shown in FIG. 18. In this way, the substrate functions as a planar light pipe. The substrate has a refractive index of about 1.5 and air has a refractive index of 1.0. Internal total reflection occurs for all angles at which an angle θ shown in FIG. 18 is less than 48.2 degrees. In this case, light is transmitted within the substrate. Light outputted from the LED is emanated, but about 90% of all light outputs outputted by a typical LED is included within an angle of plus or minus 48.2 degrees. When the light reaches the front face end portion of the substrate shown on the right-hand side of FIG. 15 and shaped so as to form a cylindrical lens 105, this light is outputted from the substrate. This shape has the effect of focusing the light onto an object. A linear microlens array 106 is arranged on the crest of the cylindrical lens in a longitudinal direction of the substrate so as to detect light reflected from the object. The pitch of the microlens array is accurately matched to that of the waveguide array. The reflected light from the object is coupled into a waveguide by this microlens. The microlens array typically has a diameter of 125 μm. Accordingly, the microlens array has little influence on the operation of the cylindrical lens typically being several millimeters in diameter.

FIG. 16 shows an arrangement in which an LED array is attached to a side face (a lower portion in FIG. 16) of the substrate. In this case, an angled reflecting plate 108 is arranged within the substrate. This reflecting plate is coated with a metal having a light reflecting property such as aluminum and formed by evaporation or sputtering. Light from the LED is first incident on the angled reflecting plate. The propagating direction of this light is turned such that this light travels along the substrate. Thereafter, this light is reflected within the substrate as described in the previous example. Since the angled reflecting plate can be easily formed by injection moulding, this method is particularly suitable for a plastic substrate. It also has the advantage that an LED light source and a CCD detector are attached onto different faces of the substrate. Namely, it is possible to use a thinner substrate in a vertical direction in FIG. 16 from a purely geometrical aspect.

FIG. 17 shows a configuration in which two LED array light sources are used. These two LED array light sources are arranged along the side end portions of the substrate. This configuration is also beneficial because an LED array 104 and a CCD detector 103 are separated from each other and the substrate can be made thinner. The side end portion of the substrate is angled such that light is projected forward onto an object. The change in intensity of light outputted from the front face of the substrate on the left-hand side of FIG. 17 is made uniform by changing the intensity of the LED light emitting body within the LED array. This can be achieved by simply arranging series resistors having suitable resistance values in the LED circuit. It is necessary to set the voltage of an LED in a central portion of the substrate to be higher than a voltage provided by light of the LED in an end portion of the substrate.

In all these cases, the LED can be firmly attached to the substrate. Accordingly, when the LED array is used, there is no risk of miss alignment caused in a general system in which all optical systems of lenses and a detector are separately arranged.

The following explanation relates to a manufacturing method of an optical device in which an injection moulded polymeric substrate is used to fabricate optical waveguides for transmitting light from the LED array to a scanned object through an integrated circular lens.

A waveguide pattern shown in FIGS. 19a and 19b is formed in a PMMA substrate (Acrypet supplied by Mitsubishi Rayon Company of Japan) by injection moulding. The groove for forming each of waveguides is 8μm×8 μm in size. If this groove is filled with a polymer of different refractive index, this groove forms multimode type waveguides. The waveguides are arranged on the front face of the substrate at an interval of 125 μm in the longitudinal direction of the substrate. This corresponds to a resolution of 200 dots per inch which is the standard for current facsimile machines. The input face of the substrate is shaped as follows. Namely, the entire shape of the input face of the substrate firstly forms the lower half of a cylindrical lens. Secondly, an array of microlenses having 125 μm in diameter and pitch is formed along an upper end portion of the substrate. The position of each of the microlenses is precisely aligned with that of the groove forming each of the waveguides so that light is coupled into the waveguide. Each of the microlenses is slightly projected from the remaining portion of the substrate so as to eliminate a joining portion formed when an upper half of the substrate is assembled. FIG. 20 shows a lower substrate design. FIG. 20 also shows a groove having an angle of 45 degrees and formed on the lower side of the substrate and forming a reflecting plate.

Then, the substrate is placed in a vacuum evaporator so that the substrate is coated with an aluminum layer having 100 nm in thickness in a region of the angled groove. Although normal evaporation procedures are used, the substrate is arranged within a chamber and is masked such that only the angled surface of the substrate is coated with the aluminum layer.

The upper half of the substrate is also formed from a similar material by injection moulding, but this formation is not described here.

A manufacturing method of the substrate will next be explained with reference to FIGS. 21a to 21f.

Figure 21A:
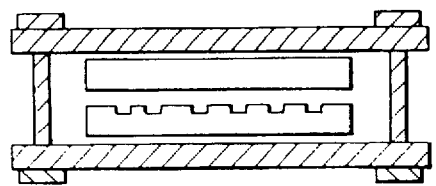
Figure 21B:
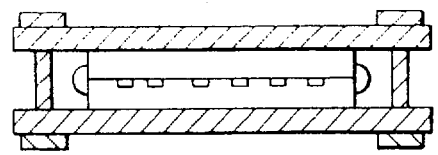

The upper and lower halves of a substrate are assembled and seams of the substrate are joined to each other by ultrasonic welding as shown in FIGS. 21a and 21b. In the ultrasonic welding, a polymer is melted such that peripheral portions of end portions of the substrate are sealed.

Figure 21C:
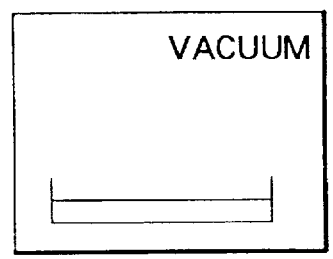
Figure 21D:
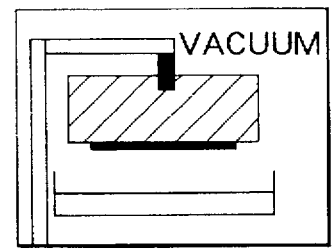
Figure 21E:
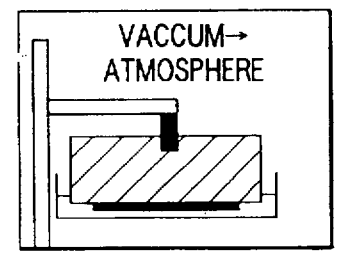
Figure 21F:
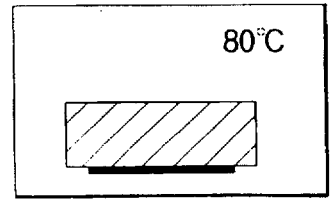

The grooves within the substrate are filled with RAV7 supplied by Mitecs, Japan. 15 ml of RAV7 is first mixed with 0.58 g of benzoyl peroxide functioning as a polymerizing catalyst. The filling method is shown in FIGS. 21c, 21d and 21e. As shown in FIG. 21c, a monomer mixture is first placed in a $10^{-4}$ Torr vacuum for 15 minutes to degas. Then, the substrate is arranged together with the monomer mixture within a vacuum chamber. In FIG. 21d, the vacuum chamber is evacuated for 30 minutes. Then, the sample is lowered into the polymer mixture in a state in which the open ends of the grooves are set to a lower side. In FIG. 21e, the pressure within the vacuum chamber is gradually raised to atmospheric pressure. The pressure within the groove is lower than that around the monomer so that the monomer is raised along the groove. When the groove is filled with the monomer, the sample is placed in an oven at 80° C. for 6 hours in FIG. 21f. During this time, the monomer polymerizes and forms a solid monomer.

An end face of the substrate on a side opposed to a shaped end portion is located on the open end side of a waveguide and is polished using alumina polishing powder with grit down to 0.2 μm. A CCD line sensor (NEC μPD3743D type without cover window) is then aligned and is attached to this end face of the substrate by using optical epoxy.

As mentioned above, in accordance with an eighth construction of the present invention, a large part of the light emitted by an illuminating device is transmitted to the face of the substrate opposite to the object by total interval reflection within the substrate so that the object is efficiently illuminated.

In accordance with a ninth construction of the present invention, the substrate is constructed with a convex face on the face opposite to the object thus forming a cylindrical lens. Accordingly, light transmitted within the substrate is converged to the object so that the object is further efficiently illuminated. Further, a light source is integrated with a waveguide and an end face of the waveguide constitutes the cylindrical lens. Accordingly, it is not necessary to align the light source and the object so that the image sensor can be stably used.

In accordance with a tenth construction of the present invention, the illuminating device is arranged on a face separated from a face with aligned CCD elements so that the substrate can be made thin.

FIGS. 22a to 22c are views showing the schematic construction of an optical scanner in the present invention. A scanned object 201 is illuminated by a light source similar to a general light source. Reflected light from the object 201 is incident on an array of microlenses 205. Each of the microlenses 205 focuses and forms one portion of the object as an image on one end face of a waveguide. Light from a single horizontal portion of the object is transmitted through a waveguide array and is incident onto a linear type CCD detector 203. The object is moved in a direction perpendicular to the microlens array. Each of horizontal lines of the image is repeatedly scanned so that the entire object is scanned. The resolution of the scanned image in a horizontal plane is determined by the size and pitch of the microlens and waveguide arrays. In a G3 type facsimile machine, a resolution of 200 d.p.i. (dot/inch) is required. This resolution corresponds to 125 µm in diameter of the microlens and pitches of the microlens and the waveguide. The size and pitch of the microlens can be reduced to improve resolution as in a computer image scanner so that a resolution of 600 d.p.i. can be easily achieved. The resolution is determined by the microlens size and a scan speed in the vertical direction.

A planar type optical waveguide is fabricated by various kinds of methods able to be realized by those skilled in the art. For example, a polymeric material capable of forming the waveguide is fabricated by using a method based on injection moulding. In this process, a polymeric substrate having a groove is made by injection moulding. A monomer such as an optical epoxy, etc. is spread on the substrate so that this groove is filled with the monomer. A separate polymeric cover is placed on this substrate and is held while the monomer is polymerized or the epoxy is cured. In this process, a waveguide pattern is prescribed by the groove shaped in the polymeric substrate. The material for filling the groove is selected such that this material has a refractive index higher than that of the polymeric substrate and the filled groove becomes an optical waveguide. The polymeric substrate can be manufactured at low cost by mass production using injection moulding. Accordingly, the present invention can be easily applied to a relatively large-sized scanner.

It is important to design the waveguide array in the present invention such that the distance between the object and the detector is small. Namely, in the design of the optical scanner in the present invention, a width W of the optical scanner as shown in FIG. 22a can be calculated by the following formula.

$$W = s' + 2r + (n/2)(a+b) \cos(\gamma - 90) + (n/2)D \tan(\gamma - 90)$$

Here, s' is the distance between a lens and a waveguide and r is the radius of curvature of a bent portion of the waveguide. Further, n is the total number of waveguides and a is the width of the waveguide. Further, b is the minimum clearance of the waveguides and D is the diameter of the lens on the input face. When the relation between the scanner width W and a bending angle $\gamma$ of the bent portion of the waveguide is calculated by the above formula, it should be understood that the scanner width is greatly changed in accordance with the bending angle $\gamma$ of the bent portion of the waveguide as shown in FIG. 23a. In this embodiment, for example, s' is 548 µm, r is 1 mm, n is 2048, a is 8 µm, b is 6 µm, and D is 125 µm. FIG. 23b enlargedly shows a graph near a minimum portion of the scanner width shown in FIG. 23a. As can be clearly seen from the graphs of FIGS. 23a and 23b, the scanner width in the present invention has a minimum value when the bending angle of the bent portion of the waveguide is set to 90 degrees. Namely, when the distance between the object and the detector is minimized, it is sufficient to use each of two 90 degree curves in the bent portion of the optical waveguide.

It is clear from the graph of FIG. 23a that the scanner width is narrower than 83 mm when the bending angle of the bent portion of the waveguide is greater than 62.1 degrees and is less than 117.9 degrees. Namely, the minimum scanner width is 83 mm in the case of the general optical scanner in which an optical system is folded by using three mirrors. Accordingly, the present invention is effective to further reduce this scanner width. Therefore, in the optical scanner of the present invention, it is preferable to set the bending angle of the bent portion of each waveguide to be greater than 62.1 degrees and less than 117.9 degrees.

FIG. 22a clearly shows the construction using each of two 90 degree curves in the bent portion of this optical waveguide. The waveguide comes in contact with both input and output faces of the optical scanner at 90 degrees. Thus, it is ensured that the optical scanner size is minimized and coupling efficiency is maximized. The waveguide has a size selected such that light throughput is maximized and interference and crosstalk between adjacent waveguides are minimized. Concretely, the size of the waveguide is selected as follows.

The array of microlenses can be fabricated by many methods. For example, the microlens array can be fabricated by ion diffusion within glass or by reactive ion etching of glass. The microlens array is attached to the substrate in alignment with waveguides by using optical epoxy, etc.

In a preferable embodiment, the microlens array can be simultaneously formed by using the same injection moulding method as the injection moulding method used to form the grooves in the polymeric substrate. This method has distinct advantages. The main advantage of this method is that it is not necessary to align the lens array and the microlens array after the optical scanner is fabricated. When a mould is prepared in an injection moulding process, the shape and position of the microlenses and waveguides are set. The microlens array and the plastic substrate having a groove aligned in advance with the microlens array are fabricated as one unit. In other advantages of the above injection moulding method, the optical scanner is easily manufactured in comparison with two units and optical performance is improved and stability of operation of the optical scanner is increased.

The microlens array is designed such that each of the image portions is converged to a separate waveguide. Further, only light scattered from a portion of the scanned object is coupled into the waveguide by setting the numerical aperture of the microlens to be equal to that of the optical waveguide. The other light incident on waveguide is not coupled into this waveguide since the other light has angles greater than the coupling angle of the waveguide. An output face of the waveguide array is mechanically polished and a CCD array is aligned with this output face and is attached onto this output face using optical epoxy, etc.

A compact optical scanner of the present invention will next be explained with reference to FIGS. 22a to 22c. This compact optical scanner is used in a G3 type facsimile machine having 256 mm in width and suitable for a paper sheet size until B4 with a resolution of 200 d.p.i. (dot/inch) as a concrete example. In FIGS. 22a to 22c, reference numerals 201, 203 and 205 respectively designate an object to be read, a CCD detector and a microlens array. Reference numerals 206 and 207 respectively designate a substrate having optical waveguides and an LED array for illuminating the object. A Citizen Electronics SNK-06A-27LED array is used as a light source. This light source requires a 24 V power supply and emits light at 570 nm. A NEC µPD3743DCCD line sensor is used as the optical detector. This sensor includes 2048 pixels with a spacing of 14 µm.

A polymethyl methacrylate (PMMA) material called Acrypet VH (supplied by Mitsubishi Rayon K.K., Japan) is selected to fabricate the substrate. This material has a refractive index of 1.492 at 570 nm in wavelength and 20° C. and further this material has high optical transparency and is very suitable for injection moulding. A waveguide core material is formed using a dimethyl carbonate based material called RAV7 H1 (supplied by Mitecs K.K., Japan). This core material can be polymerized by heating in the presence of benzoyl peroxide. The polymerized core material has a refractive index of 1.503 at 570 nm in wavelength and 20° C. This polymerized core material also has excellent optical characteristics. The numerical aperture (N.A.) of the optical waveguides fabricated by these materials is 0.181.

The microlens array is designed such that each microlens is 125 µm in diameter. This design corresponds to a specification of 200 d.p.i. The lens is designed such that this lens has a numerical aperture of 0.181 to match that of the waveguide. A focal length f of such a lens can be calculated by the following standard formula in which D is the lens diameter.

$$N.A. = \frac{D}{2f}$$

The focal length is 345 µm from the above formula.

A radius of curvature of the microlens can be also calculated by using the Gaussian formula for a single spherical surface.

$$\frac{n}{s} + \frac{n'}{s'} = \frac{n' - n}{r}$$

Here, n is the refractive index of air and n' is the refractive index of each of the lens and the polymeric substrate. In this case, the lens is fabricated from Acrypet VH. Further, n is set to 1.0 and n' is set to 1.492. In FIG. 24, a converging distance s is set to a focal length (345 µm) of the microlens and the distance s' from a corresponding lens to a waveguide is set to infinity. In this case, r is equal to 170 µm by calculating the above formula. The lens focuses and forms an image portion having 125 µm in length on an input face of the waveguide. Since the waveguide is 8 µm in diameter, it is necessary to reduce the image by the lens at a rate of 15.6. Magnification m is given from simple geometrical optics shown in FIG. 24 by the following formula.

$$m = \frac{s' - r}{s + r}$$

Accordingly, the values of s and s' are respectively 5.74 mm and 548 µm by using this formula and the Gaussian formula for a single spherical surface.

The waveguide is designed with a width of 8 µm and a minimum spacing of 6 m. The pitch of the waveguides is set to 14 µm on an interface with the CCD detector and is set to 125 µm on an input face. The waveguides come in contact with both the input and output faces to ensure maximum coupling efficiency.

When each of the optical waveguides is bent, some optical loss is inherently caused. However, this loss can be made negligible by increasing the radius of curvature (ROC) of a bent portion as follows.

$$ROC > \frac{3N^2\lambda}{\pi [N^2 - n^2 + (\lambda/2a)^2]^{3/2}}$$

Here, N is the effective refractive index of the waveguide, λ is the wavelength and a is the waveguide width. In this case, if N is 1.503 and the refractive index n of a clad is 1.492 and a changing amount of the refractive index is 0.011, a minimum radius of curvature (ROC) corresponds to about 200 µm. A value of 1.0 mm is selected as the curvature radius to completely eliminate this loss. When these parameters are used, an overall width of the waveguide device is 16.9 mm.

Then, a master mould is fabricated as mentioned above by using the design criteria calculated so far. This mould can be manufactured with high accuracy by ion milling a nickel plate using standard techniques. This master is used in a standard injection moulding machine to manufacture an Acrypet VH polymer substrate 2 mm in thickness and including a waveguide groove. Then, RAV7HI is mixed with 5% of benzoyl peroxide and is degassed for 15 minutes under a vacuum of $10^{-4}$ Torr. This mixture is spread on the moulded substrate such that the groove is completely filled with the mixture. A second flat VH polymer substrate is placed and fixed onto this mixture. A fixed unit is then placed in an oven at 80° C. for 6 hours to polymerize the RAV7HI core material.

The output face of the waveguide is polished by using a standard polishing machine (Musashino Denshi MA300) with alumina suspension down to 0.1 µm in size. The CCD unit is then aligned and is butted to the waveguide array and is fixed by using an optical grade epoxy (Lens Bond, Summers Laboratories, USA) so that the optical scanner is completely manufactured.

In accordance with the eleventh construction of the present invention, plural optical waveguides for transmitting an inputted image to CCD elements are included within a substrate formed by a polymeric material. Each of the waveguides is constructed from a polymer having a refractive index higher than that of the substrate material. Each of the waveguides has two bent portions having a bending angle of 90 degrees and is vertically arranged on a substrate face opposite to an object and a face with aligned CCD elements at both ends of each of the waveguides. Accordingly, even when the image reduction ratio is large, the distance between the object and a detector can be made small.

Accordingly, the present invention can provide a compact scanner which can increase the reduction ratio and reduce the distance between the object and the detector and has a simple structure that can be manufactured easily and cheaply.

In accordance with a twelfth construction of the present invention, plural optical waveguides for transmitting an inputted image to CCD elements are included within a substrate formed by a polymeric material. Each of the waveguides is constructed from a polymer having a refractive index higher than that of the substrate. Each of the waveguides has two bent portions having a bending angle greater than 62.1 degrees and less than 117.9 degrees. Each of the waveguides is vertically arranged on a substrate face opposite to an object and a face with aligned CCD elements at both ends of each of the waveguides. Accordingly, even when the image reduction ratio is large, the distance between the object and a detector can be made small.

Accordingly, the present invention can provide a compact scanner which can increase the reduction ratio and reduce the distance between the object and the detector and has a simple structure that can be manufactured easily and cheaply.

In accordance with a third construction of the present invention, a microlens integrated with the substrate is arranged in alignment with an end portion of each of the optical waveguides on the substrate face opposite to the object so that each of image portions can be reliably converged to each of the waveguides.

In accordance with a fourth construction of the present invention, numerical apertures of the microlens and the polymer of each of the optical waveguides are set to be equal to each other. Accordingly, it is ensured that only light scattered from a scanned image portion is coupled into each of the waveguides.

A waveguide type reduction type image sensor in another embodiment of the present invention will next be explained with reference to FIGS. 25 to 31.

Figure 26A:
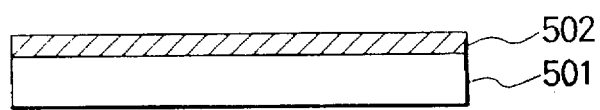
Figure 26B:
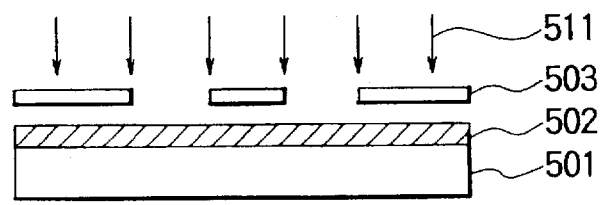
Figure 26C:
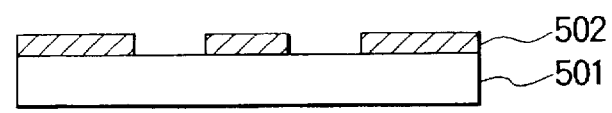
Figure 26D:
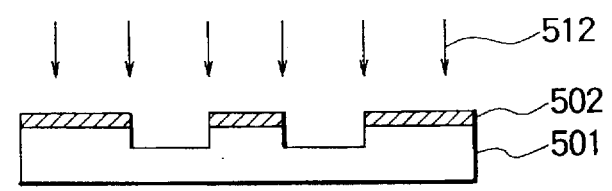
Figure 26E:

Firstly, the manufacturing method of a patterned substrate will be explained in detail with reference to FIGS. 26a to 26e. As shown in FIG. 26a, a photoresist film 502 having 8 µm in thickness is first formed on a PMMA substrate 501. As shown in FIG. 26b, a groove pattern is next transferred by photolithographic techniques. Namely, a mask 503 comes in close contact with this photoresist film 502 and the photoresist film 502 and the mask 503 are exposed to an ultraviolet ray 511. When developing processing is then performed, the groove pattern of the mask 503 is transferred to the photoresist film 502. Thus, as shown in FIG. 26c, the photoresist film 502 of the groove pattern is formed. This groove is also 8 µm in width in this embodiment of the present invention. Next, as shown in FIG. 26d, ions 512 are irradiated onto a surface of the patterned photoresist film 502 by an RIE etching method so that a groove having 10 µm in depth is formed in a substrate portion having no resist film. Finally, the photoresist film 502 is dissolved by using a resist separating agent so that a patterned PMMA substrate having the groove as a capillary having 8 µm in width and 10 µm in depth is manufactured as shown in FIG. 26e.

As shown in FIG. 25a, the groove processed in the embodiment of the present invention is set to the pattern of a reduction type optical waveguide having two bent portions. A groove 402 for reducing loss of an optical signal in the bent portions is adjacent outside each of the bent portions of the optical waveguide 401. FIG. 25b is an enlarged view showing each of the bent portions and the adjacent groove in detail. For example, the groove 401 as the optical waveguide is 8 µm in width w and the interval d between this groove and the adjacent groove 402 is 2 µm. The adjacent groove 402 is 2 µm in width u and a bent portion of the groove 401 is 200 µm in curvature radius R. Each of the grooves for the optical waveguide reach both ends of the PMMA substrate. In contrast to this, the adjacent groove 402 not reaching the PMMA substrate ends at either end is arranged such that this adjacent groove 402 has a bent portion formed in a concentric arc shape outside each of the bent portions of the grooves 401 of the optical waveguides.

Figure 1:
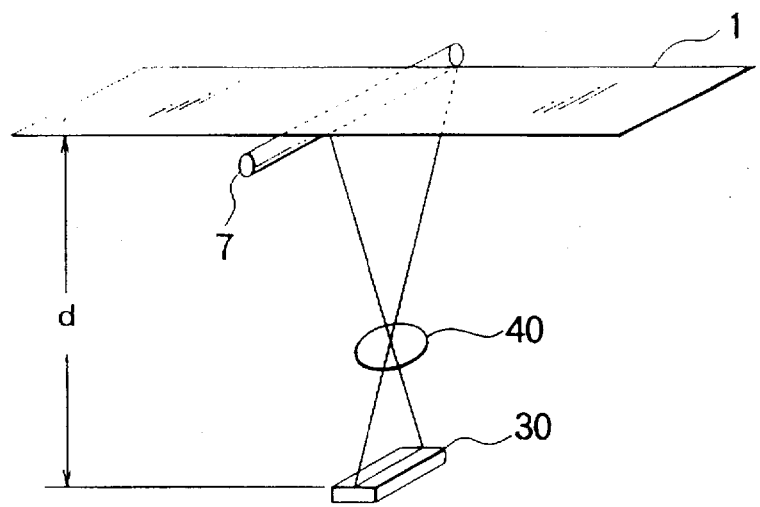
FIG. 1 is a view for explaining a general reduction type image sensor.
Figure 2:
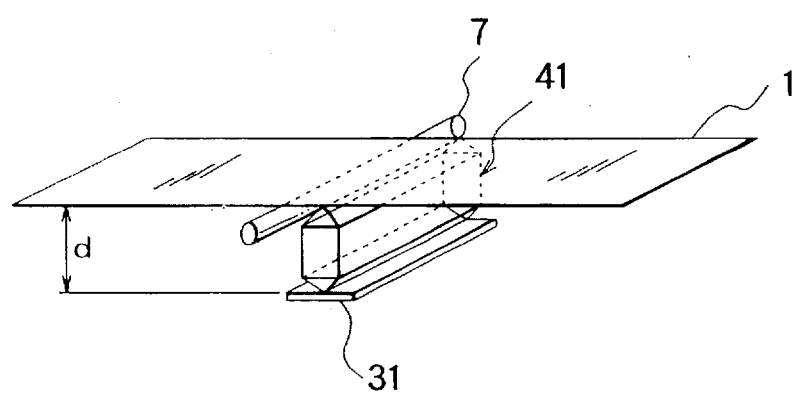
FIG. 2 is a view for explaining a general contact type image sensor.
Figure 3:
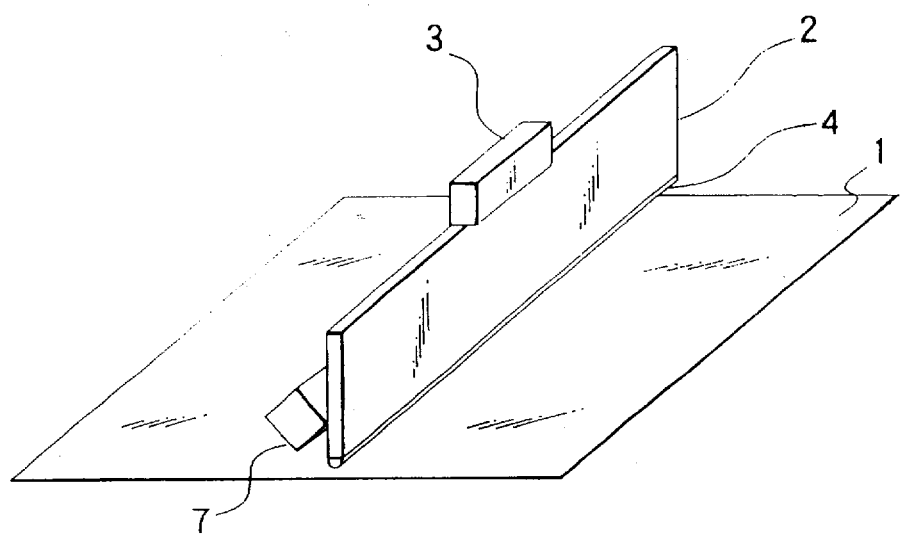
FIG. 3 is a view for explaining a general waveguide type reduction type image sensor.

Secondly, a process for making the patterned substrate manufactured as above come in close contact with a plane substrate will be explained with reference to FIGS. 2a and 27b. As shown in FIG. 27a, the patterned substrate 501 and the plane substrate 601 are set inside a jig 610 for clamping and come in close contact with each other using this jig for a clamp. Thus, the grooved portion of the patterned substrate 501 is formed in the shape of a cavity so that a capillary 602 is formed. As shown in FIG. 27b, three side faces of the clamped substrates except for a side face having one open portion of the capillary 602 as the suction port for the monomer are sealed by using seal resin 603 for a low vacuum formed by epoxy resin, etc. Thus, the other open portion not constituting the monomer suction port of the capillary 602 is also sealed. The groove not reaching the PMMA substrate ends at both ends thereof attains a state in which the air is sealed within the cavity of this groove.

Thirdly, a process for filling the capillary formed by making the pattern and plane substrates come in close contact with each other as mentioned above with a monomer solution as the core raw material will next be explained with reference to FIGS. 28a and 28b. The patterned substrate 501 and the plane substrate 601 clamped by the clamping jig 610 are set in a holder 701 within a vacuum chamber 710 as shown in FIG. 28a. The holder 701 is constructed such that the clamping jig 610 can be moved in the vertical direction. A container 702 filled with the monomer solution of allyl diglycol carbonate (RAV7) including 5% of benzoyl peroxide is arranged within the vacuum chamber 710 such that this container is located just below the clamping jig 610. The benzoyl peroxide included in the RAV7 monomer solution acts as a catalyst for polymerizing the RAV7 monomer when the benzoyl peroxide is heated. Next, the vacuum chamber 710 is evacuated to a vacuum of $10^{-4}$ Torr so that the RAV7 monomer solution is degassed and the gases within the capillary opened at one end thereof are removed therefrom. Thereafter, the clamping jig 610 is moved in a downward direction by using the holder 701 and the open portion of the capillary is dipped into the RAV7 monomer solution. Then, when the interior of the vacuum chamber 710 is leaked such that the pressure within the vacuum chamber is gradually changed from a vacuum to atmospheric pressure, the pressure within the capillary is less than the circumferential pressure of the RAV7 monomer solution so that the RAV7 monomer solution is sucked into the capillary. In this way, when a relative long capillary is filled with the monomer, the filling process of the monomer into the capillary can be performed if a change in pressure using the vacuum is utilized such that effects obtained by the capillary phenomenon are supported. No groove sealed at both ends thereof is filled with the monomer solution so that this groove is still filled with gases.

Finally, after the interior of the capillary is filled with the RAV7 monomer solution and the pressure within the vacuum chamber reaches atmospheric pressure, the clamping jig 610 is detached from the holder 701 and the RAV7 monomer solution is heated for 6 hours at a temperature of 85° C. by using an oven so that the RAV7 monomer solution is polymerized. The surface of a polymeric optical waveguide manufactured as above is polished by a standard polishing device using a diamond suspension having a size equal to or smaller than 0.5 µm so that the seal resin is removed from this surface. Thus, the polymeric optical waveguide in the present invention can be manufactured.

Light from a laser is incident on the incident end of a core of the polymeric optical waveguide manufactured as above. Light emitted from this polymeric optical waveguide is measured and transmission loss in the optical waveguide is calculated.

As a result, 55% of light is transmitted through an optical waveguide having 200 μm in curvature radius and having no adjacent groove. However, 92% of light is transmitted through an optical waveguide having 200 μm in curvature radius and having a groove.

FIG. 29 is a graph showing reducing effects of light loss in the polymeric optical waveguide manufactured in the embodiment of the present invention when the width of a groove arranged outside the bent portion of a waveguide core portion and shown by u in FIG. 25b is changed. In FIG. 29, the axis of ordinate shows the ratio of the emitting intensity of light from the waveguide for the case with the groove to an emitting intensity of light from the waveguide for the case without the groove. Namely, if the value of this ratio on the axis of ordinate is greater than one, there are effects of the groove arranged outside the bent portion of the waveguide core portion. Further, these effects are increased as this ratio value is increased. The waveguide core portion is set to have 8 μm in width and the distance between the groove and the waveguide core portion is set to 2 μm. It is known from FIG. 29 that the width u of the groove arranged outside the bent portion of the waveguide core portion is suitably set to be equal to or smaller than 2 μm in view of compactness of the waveguide and the reducing effects of light loss. In this embodiment of the present invention, this groove width is set to 2 μm since it is difficult to finely process the groove.

FIG. 30 is a graph showing the reducing effects of light loss in the polymeric optical waveguide manufactured in the embodiment of the present invention when the distance d in FIG. 25b between the waveguide core portion and a groove arranged outside the bent portion of the waveguide core portion is changed. In FIG. 30, the axis of ordinate shows the same contents as FIG. 29. The waveguide core portion is 8 μm in width and the groove is 2 μm in width. It is known from FIG. 30 that the distance d between the waveguide core portion and the groove arranged outside the bent portion of the waveguide core portion is suitably set to be equal to or smaller than 2 μm in view of compactness of the waveguide and the reducing effects of light loss. However, this distance is set to 2 μm in the embodiment of the present invention since it is difficult to finely process the groove and the waveguide core portion.

FIG. 31 is a graph showing the reducing effects of light loss in the polymeric optical waveguide manufactured as above when the difference in specific refractive index between the waveguide core portion and the material of a clad portion is changed. In FIG. 31, the axis of ordinate shows the same contents as FIG. 29. It is known from FIG. 31 that it is suitable to select materials of the core and the clad in view of the reducing effects of light loss such that the difference in specific refractive index between the core and the clad is smaller than 1.5%. In the embodiment of the present invention, materials of the core and the clad providing 0.86% as the difference in specific refractive index are used.

In this embodiment, a gas filled into the groove adjacent to the bent portion of the optical waveguide is constructed by air. However, the groove adjacent to the bent portion can be filled with various kinds of gases other than air by sticking the patterned substrate and the plane substrate to each other within a gaseous environment other than air. Accordingly, the gas filled with this groove is not limited to air in the present invention.

Further, materials of the clad and core portions are not limited to the above materials in this embodiment, but can be constructed using various materials in a combination so that the difference in specific refractive index is smaller than 1.5%.

In accordance with the waveguide type reduction type image sensor of a fifteenth construction, it is possible to reduce light loss caused when light is transmitted through the bent portion of a waveguide. Accordingly, light transmittance of the waveguide can be increased.

In accordance with the waveguide type reduction type image sensor of a sixteenth construction, a groove can be easily filled with a gas by manufacturing this image sensor within a gaseous environment.

In accordance with the waveguide type reduction type image sensor of a seventeenth construction, light loss in the bent portion can be effectively reduced when the waveguide is made compact.

In accordance with the waveguide type reduction type image sensor of an eighteenth construction, light loss in the bent portion can be effectively reduced when the waveguide is made compact.

In accordance with the waveguide type reduction type image sensor of a nineteenth construction, light loss in the bent portion can be further effectively reduced when sizes, etc. of the waveguide and the groove are set to be equal to each other.

In accordance with a manufacturing method of the waveguide type reduction type image sensor having a twentieth construction of the present invention, the optical waveguide and the groove can be easily filled with respective materials having different refractive indexes. Further, the optical waveguide having a structure of the present invention can be very simply manufactured by using this manufacturing method.

Many widely different embodiments of the present invention may be constructed without departing from the spirit and scope of the present invention. It should be understood that the present invention is not limited to the specific embodiments described in the specification, except as defined in the appended claims.

What is claimed is:

1. A compact optical scanner for scanning the image of an object while this object image is inputted and read;
   the compact optical scanner comprising:
   a substrate having a face opposite to the object to input the object image and a face with aligned CCD elements for reading the object image; and
   plural optical waveguides for transmitting the inputted image to the CCD elements and arranged within said substrate such that one end of each of the optical waveguides is arranged on the substrate face opposite to said object and the other end of each of the optical waveguides is coupled into each of the CCD elements;
   the compact optical scanner being constructed such that said substrate is constructed from a polymer;
   each of said optical waveguides is constructed by a polymer as a material having a refractive index higher than that of said polymer of the substrate;
   each of said optical waveguides has two bent portions having a bending angle of 90 degrees; and
   each of the optical waveguides is vertically arranged on the substrate face opposite to said object and the face with aligned CCD elements at both ends of each of the optical waveguides.

2. A compact optical scanner for scanning the image of an object while this object image is inputted and read;
   the compact optical scanner comprising:
   a substrate having a face opposite to the object to input the object image and a face with aligned CCD elements for reading the object image; and plural optical waveguides for transmitting the inputted image to the CCD elements and arranged within said substrate such that one end of each of the optical waveguides is arranged on the substrate face opposite to said object and the other end of each of the optical waveguides is coupled into each of the CCD elements;

the compact optical scanner being constructed such that said substrate is constructed from a polymer;

each of said optical waveguides is constructed from a polymer having a refractive index higher than that of said polymer of the substrate;

each of said optical waveguides has two bent portions having a bending angle greater than 62.1 degrees and less than 117.9 degrees; and each of the optical waveguides is vertically arranged on the substrate face opposite to said object and the face with aligned CCD elements at both ends of each of the optical waveguides.

3. A compact optical scanner as claimed in claim 2, wherein a microlens integrated with said substrate is arranged in alignment with an end portion of each of the optical waveguides on said substrate face opposite to said object.

4. A compact optical scanner as claimed in claim 3, wherein numerical apertures of said microlens and the polymer of said optical waveguides are set to be equal to each other.

* * * * *

UNITED STATES PATENT AND TRADEMARK OFFICE
CERTIFICATE OF CORRECTION

PATENT NO. : 5,747,796
DATED : May 5, 1998
INVENTOR(S) : HEARD et al.

It is certified that error appears in the above-identified patent and that said Letters Patent is hereby corrected as shown below:

TITLE PAGE, ITEM [75]:

Left Column, lines 4 to 7, delete "; Noboru Ohtani, Tokyo; Yutaka Unuma, Matsudo; Manabu Fujimoto, Kashiwa, all of".

Left Column, line 4, change "Inventors" to --Inventor--.

Left Column, line 4, after "Kashiwa" insert --,--.

Signed and Sealed this

Twenty-ninth Day of September, 1998

Attest:

BRUCE LEHMAN

Attesting Officer

Commissioner of Patents and Trademarks